United States Patent
Leguijt et al.

(10) Patent No.: US 10,444,489 B2
(45) Date of Patent: *Oct. 15, 2019

(54) ELECTROWETTING ELEMENT

(71) Applicant: Amazon Technologies, Inc., Seattle, WA (US)

(72) Inventors: Robin Leguijt, Eindhoven (NL); Romaric Mathieu Massard, Eindhoven (NL); Jurrien Mans, Eindhoven (NL); Muhammad Arief Adityaputra, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 314 days.

This patent is subject to a terminal disclaimer.

(21) Appl. No.: 15/268,240

(22) Filed: Sep. 16, 2016

(65) Prior Publication Data

US 2017/0003497 A1 Jan. 5, 2017

Related U.S. Application Data

(63) Continuation of application No. 14/228,776, filed on Mar. 28, 2014, now Pat. No. 9,447,282, which is a (Continued)

(30) Foreign Application Priority Data

Dec. 21, 2012 (GB) .................................. 1223321.9

(51) Int. Cl.
*G02B 26/00* (2006.01)
*C09B 33/12* (2006.01)
(Continued)

(52) U.S. Cl.
CPC ............ *G02B 26/005* (2013.01); *C09B 1/005* (2013.01); *C09B 13/02* (2013.01); *C09B 23/105* (2013.01);
(Continued)

(58) Field of Classification Search
CPC ......... C09B 33/12; C09B 33/16; C09B 33/18; C09B 33/24; C09B 43/32; G02B 26/005
See application file for complete search history.

(56) References Cited

U.S. PATENT DOCUMENTS 8,199,409 B2  6/2012 Hayes et al.
9,447,282 B2 * 9/2016 Leguijt ................... C09B 33/24

FOREIGN PATENT DOCUMENTS

CN   102221745 A1  10/2011
WO   2005098797 A2  10/2005
(Continued)

OTHER PUBLICATIONS

Koyama et al., "Synthesis and Characterization of Photo-Responsive Carbosilane Dendrimers," Molecules 2009, 14, 2226-2234.
(Continued)

*Primary Examiner* — Bijan Ahvazi
(74) *Attorney, Agent, or Firm* — EIP US LLP

(57) ABSTRACT

Electrowetting element including a compound comprising a plurality of colorant moieties and a linker. The plurality of colorant moieties includes a first colorant moiety having a first net dipole and a second colorant moiety having a second net dipole. The plurality of colorant moieties are linked by and disposed around the linker so that the first net dipole and the second net dipole at least partially cancel each other.

22 Claims, 4 Drawing Sheets

Related U.S. Application Data continuation of application No. PCT/EP2013/077504, filed on Dec. 19, 2013.

(51) Int. Cl.

| | | |
|---|---|---|
| C09B 33/24 | (2006.01) | |
| C09B 33/16 | (2006.01) | |
| C09B 33/18 | (2006.01) | |
| C09B 13/02 | (2006.01) | |
| C09B 23/10 | (2006.01) | |
| C09B 55/00 | (2006.01) | |
| C09B 57/00 | (2006.01) | |
| C09B 57/02 | (2006.01) | |
| C09B 1/00 | (2006.01) | |
| C09B 29/01 | (2006.01) | |
| C09B 43/32 | (2006.01) | |

(52) U.S. Cl.
CPC .......... *C09B 29/0003* (2013.01); *C09B 33/12* (2013.01); *C09B 33/16* (2013.01); *C09B 33/18* (2013.01); *C09B 33/24* (2013.01); *C09B 43/32* (2013.01); *C09B 55/005* (2013.01); *C09B 55/006* (2013.01); *C09B 57/007* (2013.01); *C09B 57/02* (2013.01)

(56) References Cited

FOREIGN PATENT DOCUMENTS

| WO | 2006011101 | A1 | | 2/2006 | |
|---|---|---|---|---|---|
| WO | 2006031851 | A1 | | 3/2006 | |
| WO | 2008142086 | A1 | | 11/2008 | |
| WO | WO-2008142086 | A1 | * | 11/2008 | .......... G02B 26/005 |
| WO | 3071346 | A1 | | 6/2012 | |
| WO | 2012102802 | A1 | | 8/2012 | |
| WO | WO-2012102802 | A1 | * | 8/2012 | ............... G02B 3/14 |
| WO | 2012161098 | A1 | | 11/2012 | |
| WO | WO-2012161098 | A1 | * | 11/2012 | .......... C07D 231/46 |
| WO | 2012169445 | A1 | | 12/2012 | |
| WO | WO-2012169445 | A1 | * | 12/2012 | ............. C09B 23/04 |

OTHER PUBLICATIONS

Schilling and Katz, "Synthetic Approaches to Head-to-Tail Linked Azo Dyes for Nonlinear Optical Applications," Chemistry of Materials, 1989, 1, 668-673.

Lorenz et al., "A Mesogen-Functionalized Carbosilane Dendrimer: A Dendritic Liquid Crystalline Polymer," Adv. Mater. 1996, 8, No. 5, 414-416.

Pereverzev et al., "Guest-Host Cooperativity in Organic Materials Greatly Enhances the Nonlinear Optical Response," J. Phys. Chem. C 2008, 112, 4355-4363.

Sullivan et al., "Theory-Guided Design and Synthesis of Multichromophore Dendrimers: An Analysis of the Electro-optic Effect," JACS, 2007, 129, 7523-7530.

Smith, et al., "March's Advanced Organic Chemistry: Reactions, Mechanisms and Structure", 6th Addition, ISBN: 13:978-0-471-72091-1, pp. 535, 536, 690, 692, 704, 706, 708, 710, 712, 714, 718, 720, 722, 724, 899, 900, 902, 1273, 1274, 1411, 1412, 1414, 1418, 1424, 1426, 1428, 1436, and 1438.

* cited by examiner

ELECTROWETTING ELEMENT

CROSS REFERENCE TO RELATED APPLICATIONS

This application is a continuation under 35 U.S.C. § 120 of U.S. application Ser. No. 14/228,776 filed on Mar. 28, 2014, which is a continuation of PCT Application No. PCT/EP2013/077504 filed Dec. 19, 2013, which claims foreign priority to UK Application No. 1223321.9 filed on Dec. 21, 2012. The contents of each of the above-mentioned applications are incorporated by reference herein.

BACKGROUND

Electrowetting display devices are known. In an off state of such a display device an oil covers the area of a pixel of the display. In an on state the oil is retracted so as not to cover the pixel area. To switch the pixel into the on state a voltage is applied across the oil via an electrically conductive fluid immiscible with the oil, which exerts an electrostatic force on the conductive fluid, and to switch the pixel into the off state the voltage is switched off. Thus, for example, where the oil is coloured, a radiation beam passing through the pixel when in the off state passes through the oil and is imparted with colour, but does not pass through the oil with the pixel in the on state, and so its colour remains substantially unchanged.

In such an electrowetting device, the phenomenon of backflow is known. Backflow is where, despite the voltage being switched on and continuously applied, the oil tends to flow back from the on state to eventually adopt the off state. Due to backflow, disadvantageously, a desired optical effect which would be provided in a radiation beam by the oil in the on state is not maintained. Instead, an undesired optical effect corresponding to the oil being in the off state, or in an intermediate state between the on and off states is provided.

Techniques are known for reducing backflow. For example, using a compound such as a dye with approximately no overall polarity has been found to reduce backflow. However, for asymmetric dye compounds for example, it can be more difficult to provide a compound with approximately no overall polarity.

It is desirable to provide further improvements for electrowetting apparatus, for example for reducing backflow.

DETAILED DESCRIPTION

Examples relate to electrowetting apparatus, particularly, but not exclusively, to a dye for a fluid of electrowetting apparatus.

Before describing detailed embodiments referencing the FIGs, embodiments will be described in summary form.

In accordance with first embodiments, there is provided electrowetting apparatus including a compound comprising a plurality of colorant moieties and a linker, the plurality of colorant moieties including a first colorant moiety having a first net dipole and a second colorant moiety having a second net dipole, wherein the plurality of colorant moieties are linked by and disposed around the linker so that the first net dipole and the second net dipole at least partially cancel each other.

According to further embodiments, there is provided a compound comprising a plurality of colorant moieties and a linker, the plurality of colorant moieties including a first colorant moiety having a first net dipole and a second colorant moiety having a second net dipole, wherein the plurality of colorant moieties are linked by and disposed around the linker so that the first net dipole and the second net dipole at least partially cancel each other.

Examples of embodiments will now be described in detail.

Figure 1:
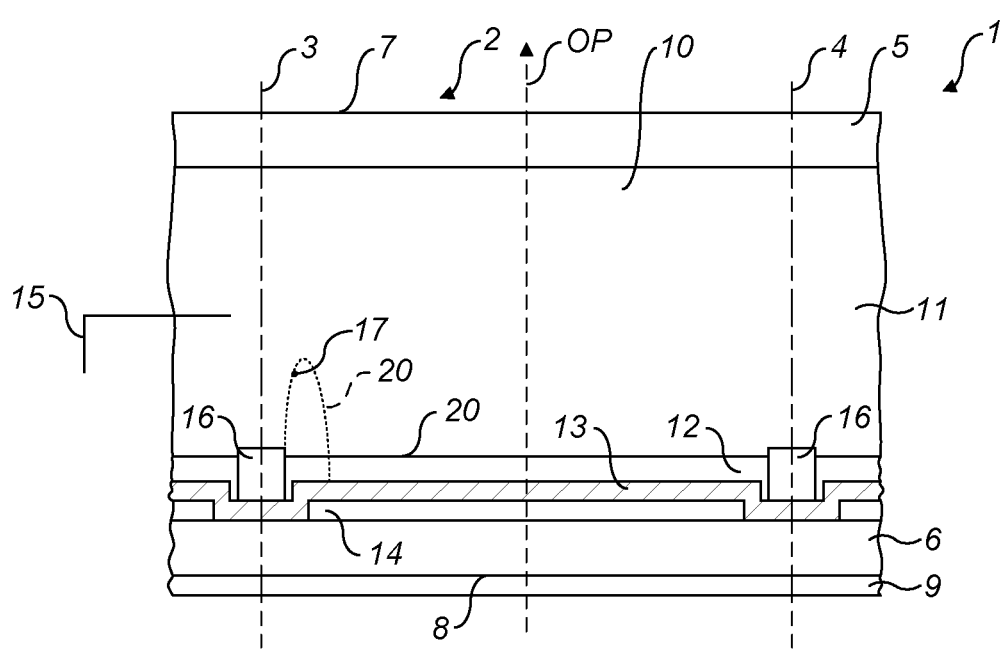
FIG. 1 shows a schematic cross-section of part of an example of a known display device.

FIG. 1 shows a schematic cross-section of part of a known example of a display device 1. The display device is an example of electrowetting apparatus and includes a plurality of electrowetting elements 2, one of which is shown in FIG. 1. The lateral extent of the element is indicated in FIG. 1 by the two dashed lines 3, 4. The electrowetting elements comprise a first support plate 5 and a second support plate 6. The support plates may be separate parts of each electrowetting element, but the support plates may be in common for the plurality of electrowetting elements. The support plates may be made for instance of glass or polymer and may be rigid or flexible.

The display device has a viewing side 7 on which an image formed by the display device can be viewed and a rear side 8. The first support plate faces the viewing side; the second support plate faces the rear side. The image is formed by light passing through each electrowetting element from the rear side 8 to the viewing side 7, where it is transmitted through the first support plate 5. Alternatively, the element may include a reflector for reflecting light, entering the element from the viewing side 7 back through the viewing side 7. Such a reflective element may alternatively be constructed with a second liquid 11 described below, the electrode 14, the hydrophobic layer 13 and the walls 16 adjacent the first support plate 5. The image is built up of picture elements. Each picture element may contain a single electrowetting element. Alternatively, each picture element may contain a plurality of electrowetting elements, each electrowetting element forming a sub-picture element. The latter picture element may for example include three sub-picture elements provided with colour filters for red, green and blue, thereby forming an RGB picture element.

An illumination unit 9 may be attached to the rear side 8 of the plurality of electrowetting elements to provide backlighting of the electrowetting elements. The illumination unit may comprise a single white light source. It may also comprise a plurality of colour light sources e.g. for spectrum sequential operation of the display. The colours of the light sources may for example be yellow and blue. The light sources may be conventional light sources, such as fluorescent lamps or LEDs. The illumination unit may be of a conventional construction, such as disclosed for instance in international patent application WO 2006/011101.

A space 10 between the support plates is filled with a first fluid and a further, second fluid, for instance a first liquid 12 and a second liquid 11 respectively. The first liquid is immiscible with the second liquid. The second liquid is electrically conductive or polar, and may be a water or salt solution such as a solution of potassium chloride (KCl) in a mixture of water and ethyl alcohol. The second liquid may be transparent. The first liquid is electrically non-conductive and may for instance be an alkane like decane or hexadecane, silicone oil, or decaline (otherwise known as bicyclo- 4,4.0-decane). A hydrophobic layer 13 is arranged on the electrode 14, facing the space 10. The layer may be an uninterrupted layer extending over a plurality of electrowetting elements or it may cover only the cross-section of one electrowetting element. The layer may be for instance an amorphous fluoropolymer layer such as AF1600 or other low surface energy polymers such as Parylene. The hydrophobic character causes the first liquid to adhere preferentially to the support plate 6.

Each electrowetting cell includes an electrode 14 arranged on the support plate 6. The electrode is separated from the liquids by an insulator which may be the hydrophobic layer 13. In general, the electrode has the same shape as the cross-section of the electrowetting element, but in other embodiments the electrode may have a different shape than the cross-section of the electrowetting element. A second electrode 15 is connected to the conductive second liquid 11. This electrode can be common to a series of electrowetting cells that share the second liquid, uninterrupted by walls. The electrodes on the support plate 6 are connected to an electrical terminal on the support plate by a matrix of printed wiring. The electrodes 14 may be transparent and made of e.g. indium tin oxide or reflecting (e.g. aluminium). The matrix may include switching elements such as transistors; in this case the matrix is called an active matrix. Thus, the apparatus comprises at least one electrode arranged relative to the fluids such that applying an electrical potential to the at least one electrode changes a configuration of the fluids.

The lateral extent of the first liquid 12 is constrained to one electrowetting element by walls 16 or hydrophilic areas that follow the cross-section of the electrowetting cell. Further details of the electrowetting cell and its manufacture are disclosed amongst others in international patent application WO 2005/098797.

The first liquid absorbs at least a part of the optical spectrum. The liquid may be transmissive for a part of the optical spectrum, forming a colour filter. For this purpose the liquid may be coloured by addition of pigment particles or dye. Alternatively, the liquid may be black, i.e. absorb substantially all parts of the optical spectrum.

When a nonzero voltage is applied between the electrodes 14, 15, electrostatic forces will move the second liquid 11 towards the electrode 14, thereby repelling the first liquid 12 from the area of the electrode 14 to the walls 16 surrounding the area of the electrode. The repelled liquid is schematically indicated by a dashed line 17. This action removes the first liquid from an optical path OP that runs from the rear side 8 to the viewing side 7 through the electrowetting element. In an embodiment where the element reflects light entering the viewing side 7 back out through the viewing side 7, this action removes the first liquid substantially from the path of the incident and reflected light. When the voltage is returned to zero, the first liquid flows back to cover the hydrophobic layer 13. In this way the first liquid forms an electrically controllable light switch whereby the first and second liquids (12 and 11, respectively) are switchable between a first configuration of the liquids and a second configuration of the liquids. The first configuration corresponds with the position of the liquids 11, 12 when the first liquid 12 has the position indicated by dashed line 17. The second configuration corresponds with the position of the liquids 11, 12 when the first liquid 12 covers the hydrophobic layer 13.

In the above description of the electrowetting cell the first liquid 12 either covers the area of the electrode 14 or is removed from it. International patent application WO 2003/071346 discloses measures that allow the first liquid to cover the area of the electrode 14 only partially, thereby realising so-called grey level display states.

Backflow may be observed in the display device 1 described above. With the nonzero voltage being continuously applied, without interruption, between the electrodes 14, 15 the first and second liquids 12, 11 may flow back from the first configuration to eventually adopt the second configuration.

Without wishing to be bound to any theory, it is believed that this backflow occurs because the first liquid 12 becomes charged or polarised during application of the nonzero voltage.

If the first liquid 12 becomes charged or polarised, the first liquid may consequently be more strongly attracted to the surface of the hydrophobic layer 13 than the second liquid 11. With a zero voltage applied, this effect does not occur. Thus, the energy of the electric field provided by application of the nonzero voltage may initiate the backflow. When the first liquid 12 becomes sufficiently charged or polarised, the first liquid 12 tends to adhere to the hydrophobic layer 13 and flows back across the hydrophobic layer 13, with a rate dependent on the properties of for example a dye in the first liquid. With continued application of the nonzero voltage, the first liquid 12 flows back and eventually, the liquids 11, 12 adopt the second configuration. In the absence of any backflow, the hydrophobic layer 13 would otherwise be covered by the second liquid 11 in the first configuration.

The charging of the first liquid 12, may be attributed to a polarity of an additive, such as a dye, in the first liquid 12. With the application of the nonzero voltage, polar additive molecules are believed to orientate themselves with respect to the electric field created through the liquids. This orientation may be an alignment of the molecules with respect to other additive molecules and to the electric field. The polarity of the molecules in combination with such orientation may cause interaction with the second liquid 11 and possibly cause migration of ions from the second liquid 11 to the first liquid 12.

According to embodiments, there is provided electrowetting apparatus including a compound comprising a plurality of colorant moieties and a linker, the plurality of colorant moieties including a first colorant moiety having a first net dipole and a second colorant moiety having a second net dipole, wherein the plurality of colorant moieties are linked by and disposed around the linker so that the first net dipole and the second net dipole at least partially cancel each other.

In some embodiments the electrowetting apparatus is the display device described above and illustrated by FIG. 1, and the compound of embodiments is provided in the first liquid.

The compound has the general formula: $(L)-(CM)_n$ where L represents the linker, CM represents a colorant moiety, and n is an integer indicating the number of colorant moieties bonded to the linker, n having a value of 2, 3, 4 or more.

A colorant moiety is a part of the compound which contributes to a colour property of the compound, and therefore has a characteristic absorption spectrum for light specific to that colorant moiety. Each of the colorant moieties may have at least one chromophore; a chromophore is a chemical group such as an azo group responsible for providing a colour property to the colorant moiety; for example the chromophore may be a conjugated chemical system. There may be more than one chromophore in each colorant moiety, each chromophore being separated by at least one atom which does not contribute to the colour property provided by the chromophores. For example, a colorant moiety may comprise a first azo group and a second azo group, which are not conjugated with each other.

The linker does not include a chromophore and therefore does not substantially contribute to the colour properties of the compound. By substantially contribute it is meant that the colour properties of the compound is primarily, i.e. 95% or more, contributed to by the plurality of colorant moieties rather than the linker, for example if the linker is not conjugated with the colorant moieties. In other words the linker does not act as a chromophore or at least part of a chromophore. A bond between the linker and at least one colorant moiety may however contribute to the colour property of the compound.

In embodiments described herein, the plurality of colorant moieties are disposed around, i.e. are arranged around, the linker so that at least a first net dipole and a second net dipole of a first and second colorant moiety, respectively, at least partially cancel each other. The arrangement of the colorant moieties around the linker may be determined by the structure of the linker but may also be determined by stereochemical interactions of the colorant moieties with each other and/or with the linker. The examples of colorant moieties to be described are monovalent for bonding the linker, but in further examples a colorant moiety may have more than one valency for bonding to the linker.

In the embodiments described herein, it has been found that by linking the plurality of colorant moieties with the linker so that at least a first and second net dipole at least partially cancel each other, a net dipole of the compound may be reduced compared with the total dipole of the first and second net dipoles if arranged to add together. For example, compounds described herein have a net dipole which is at least 50% less than the total dipole of the plurality of colorant moieties if arranged to add together. In other embodiments, a compound has a net dipole which is at least 60%, 70%, 80%, 90%, 95% or 98% less than the total dipole of the plurality of colorant moieties. By reducing the net dipole in this way, some compounds according to embodiments may be used to reduce backflow. In particular, for example, a compound comprising the linker

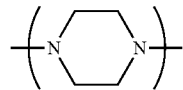

may reduce backflow.

Compounds described herein can therefore provide the first fluid of the electrowetting apparatus with desirable color properties, provided by the colorant moieties, but may also exhibit less backflow than if the colorant moieties were provided in the first fluid without being linked together. Depending on the disposition of the colorant moieties around the linker, and the structure of the linker and colorant moieties, in some embodiments the net dipole of the compound may be substantially zero. In such embodiments, the compound may reduce or eliminate backflow from occurring when included in the first fluid. Substantially zero means the compound has no net dipole when depicted with an idealized geometry, but that the compound may have transient dipoles, for example through electron cloud variations and/or stereochemical changes when the compound is in situ, for example in the first fluid. In some embodiments the linker may have a net dipole. In other embodiments, to contribute to the substantially zero net dipole of the compound, the linker may have a low net dipole or a net dipole of zero.

It is noted that the term dipole refers to a separation of charge between a first part of a molecule and a second part of a molecule. In embodiments described herein, the term dipole means a dipole when an electric field is applied to the compound in question, for example the electric field applied for switching the first and second fluids to the first configuration. It is envisaged that although the term dipole herein relates to situations when an electric field is applied, it may also apply to situations where no electric field is applied.

The term net dipole refers to an overall dipole of a compound; for example, the net dipole of a colorant moiety is the overall dipole of that colorant moiety. The net dipole is therefore the resulting dipole of a combination of individual dipoles, permanent and/or transient, of the compound in question. Such an individual dipole may for example lie along a bond between a more electronegative atom and a less electronegative atom.

Compounds described according to embodiments represent a newly identified class of compounds for electrowetting apparatus, some of which may reduce backflow, for example when dissolved in the first fluid of electrowetting apparatus such as that described above. For example, experimental data shows that some compounds can reduce backflow by at least 50%, and in other embodiments, at least 60%, 70%, 80%, 90%, 95% or 98%, when compared with the unlinked colorant moiety dissolved in the first fluid with the same optical density. At least some of the compounds described herein are novel.

Figure 2A:
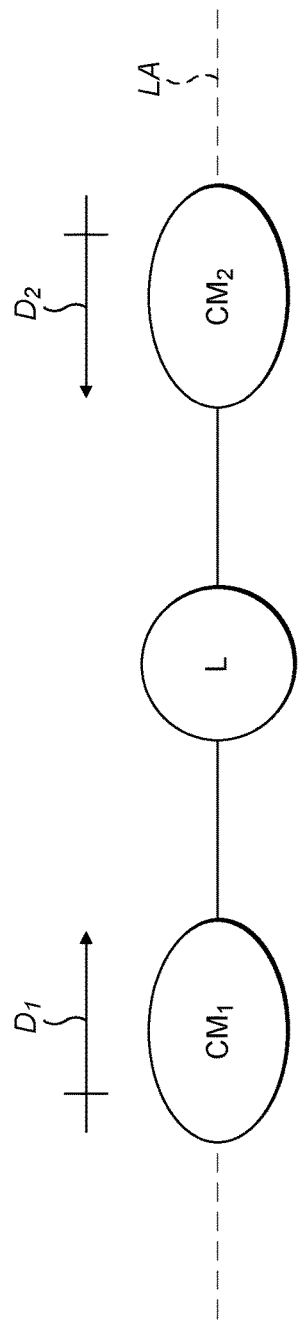
FIGS. 2a, 2b and 2c show schematically compounds in accordance with embodiments.

Embodiments will now be described with different numbers of colorant moieties. In such embodiments, there is at least a first colorant moiety and a second colorant moiety. In some embodiments the first colorant moiety and the second colorant moiety in embodiments are disposed around the linker so that the first net dipole and the second net dipole are at least partially opposed to each other; thus the first and second net dipoles at least partially cancel each other. In some embodiments the first net dipole and the second net dipole completely oppose each other. In some such embodiments the plurality of colorant moieties includes only the first and second colorant moieties, wherein when depicted with an idealised geometry the compound is substantially linear, the first net dipole and the second net dipole being substantially coincident along a linear axis. FIG. 2a illustrates such an embodiment; the first colorant moiety is labelled $CM_1$, the second colorant moiety is labelled $CM_2$, the first net dipole is labelled $D_1$, the second net dipole is labelled $D_2$ and the linker is labelled L. The compound is linear along the linear axis LA. It can be seen that in this example the first and second net dipoles completely oppose each other and therefore, where each colorant moiety has the same magnitude of net dipole, for example if each colorant moiety is the same, the net dipole of the compound is zero; i.e. the first and second net dipoles completely cancel each other.

Figure 2B:
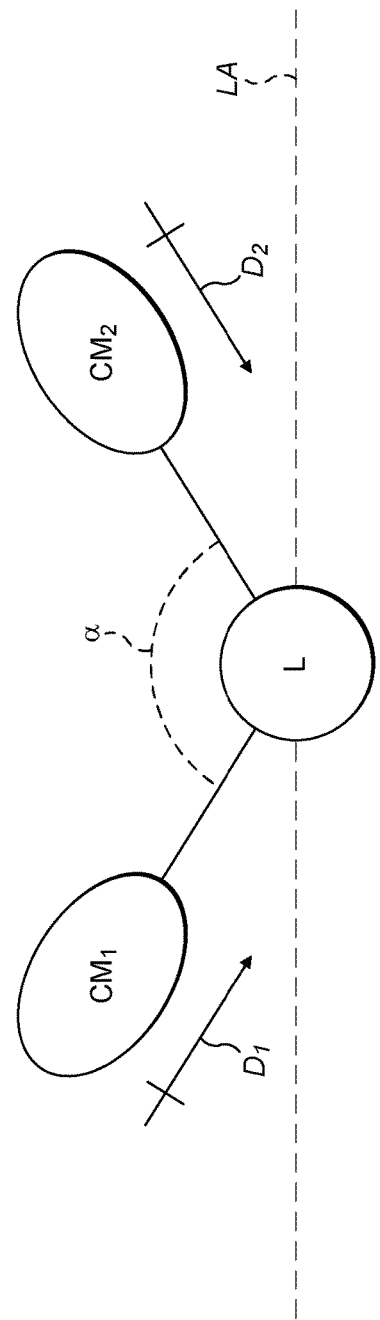

Referring to FIG. 2b, it is to be appreciated that in further examples the first and second colorant moieties may not lie along the linear axis LA, but that the compound is considered to be substantially linear as an angle α between the bonds linking each colorant moiety to the linker is in the range of 135 to 225 degrees. In this example the first and second net dipoles lie in the same direction as the bonds linking respectively the first and second colorant moieties to the linker. Despite the compound not being completely linear, but substantially linear, the first and second net dipoles are partially opposed and therefore partially cancel. This partial cancellation reduces the net dipole of the compound.

Figure 2C:
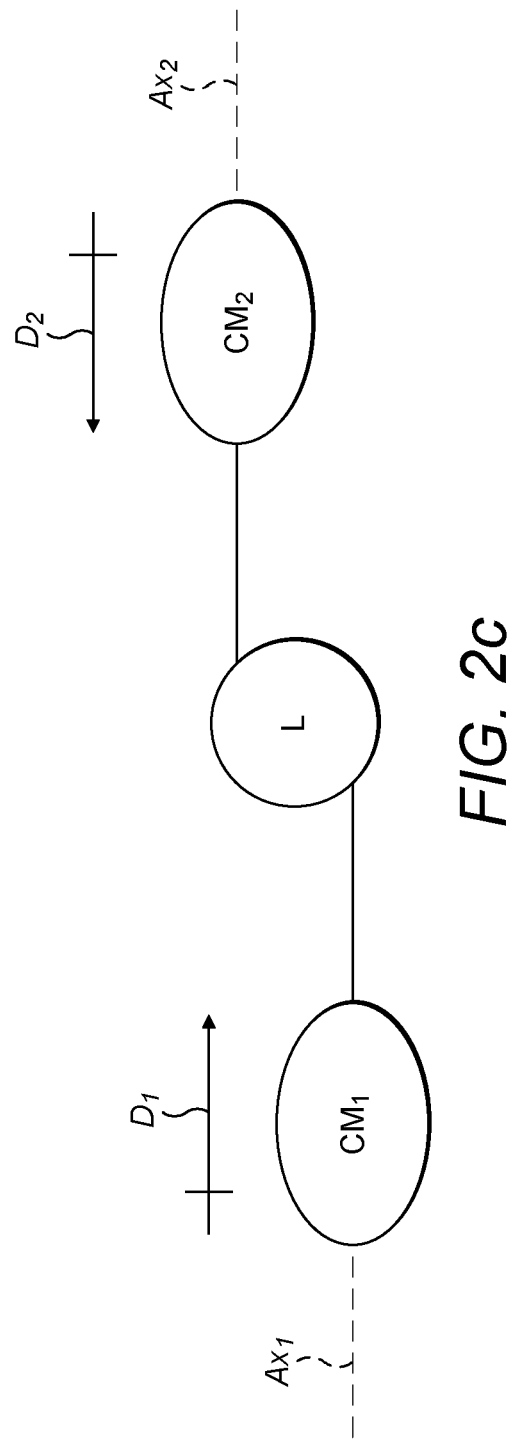

In further embodiments, at least a first and second net dipole are not coincident with a linear axis, or substantially linear. Instead, as illustrated in FIG. 2c, the first and second net dipoles $D_1$, $D_2$ of the first and second colorant moieties $CM_1$, $CM_2$ may lie on different axes $Ax_1$ and $Ax_2$ which are parallel with each other, or which are substantially parallel, i.e. within a range of 135 to 225 degrees, with each other; in this way the first and second net dipoles still at least partially oppose each other, resulting in at least partial cancellation of the first and second net dipoles.

The principles described in relation to FIGS. 2a and 2b, and the previous paragraph, in relation to at least partial cancellation of dipoles apply to further embodiments to be described comprising two or more colorant moieties. In some embodiments, the linker and/or the colorant moieties are rigid, or their flexibility is limited; for example the linker and/or at least one of the plurality of colorant moieties is substantially planar, and may for example comprise a cyclic group such as a cycloakyl or an aryl; this can help maintain the spatial disposition of the colorant moieties around the linker, to maintain the relative position of the net dipoles of the colorant moieties when the compound is in an applied electric field, thus maintaining the at least partial cancellation of the net dipoles of the colorant moieties. The term substantially planar means at least three adjacent atoms of a core structure of a molecule lie in the same plane.

In one set of embodiments, the linker is divalent for linking the first and second colorant moieties. The linker may be divalent for only linking the first and second colorant moieties, or the linker may have at least one further valency for bonding to at least one non-colorant moiety.

In examples, the linker has a general formula selected from the group consisting of:

i.e. a single bond;

i.e. a double bond;

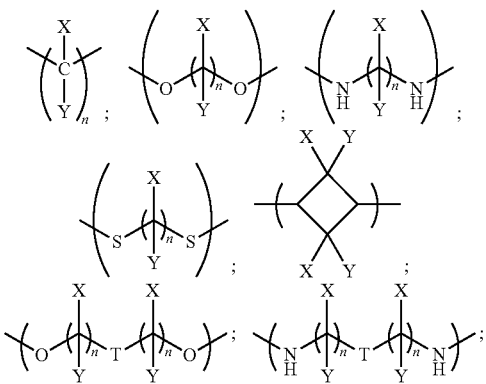

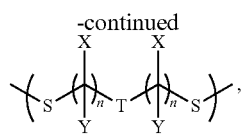

wherein each n independently=1, 2, 3, 4, 5, 6, 7 or 8,

X and Y are each independently selected from the group consisting of: hydrogen (H), a halogen atom, an alkyl group, an alkenyl group, an aryl group, an alkoxy group, and a thioalkyl group, and/or a pair of X and Y on the same carbon, taken together, is an oxo group, an acetal group or a thioacetal group, and T is oxygen (O) or sulphur (S).

In further such examples, for example where n is greater than 2, there may be bridging in the alkyl group to improve the rigidity of the compound.

In further examples, the linker has a formula selected from the group consisting of:

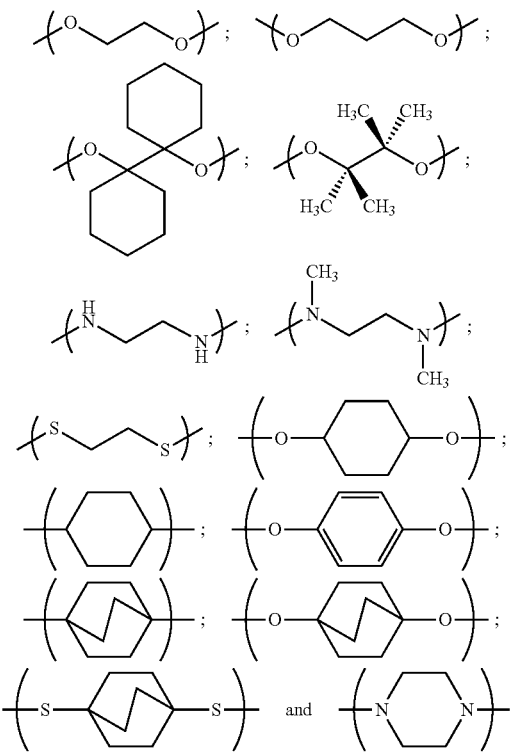

In further embodiments, the plurality of colorant moieties includes at least one further colorant moiety having at least one further net dipole, wherein the plurality of colorant moieties are disposed around the linker so that the first, second and at least one further net dipoles at least partially cancel each other. In some such examples, there may be three, four or more colorant moieties each having a net dipole.

In examples, the at least one further colorant moiety comprises a third colorant moiety having a third net dipole, and the linker may be trivalent for linking the first, second and third colorant moieties. The linker may be trivalent for only linking the first, second and third colorant moieties, or the linker may have at least one further valency for bonding to at least one non-colorant moiety.

In some examples, the linker links the first, second and third colorant moieties in a disposition around the linker such that the first, second and third net dipoles at least partially cancel each other. In some examples each one of the first, second and third net dipoles are disposed around the linker to at least partially cancel each other of the first, second and third net dipoles; for example, each colorant moiety may be disposed around the linker such that each net dipole is spaced equally from the other net dipoles, and so the orientation of the net dipoles is such that they at least partially cancel each other. The colorant moieties may be disposed within the same plane, or may be disposed in three dimensional space.

In further examples, the linker is selected from the group consisting of:

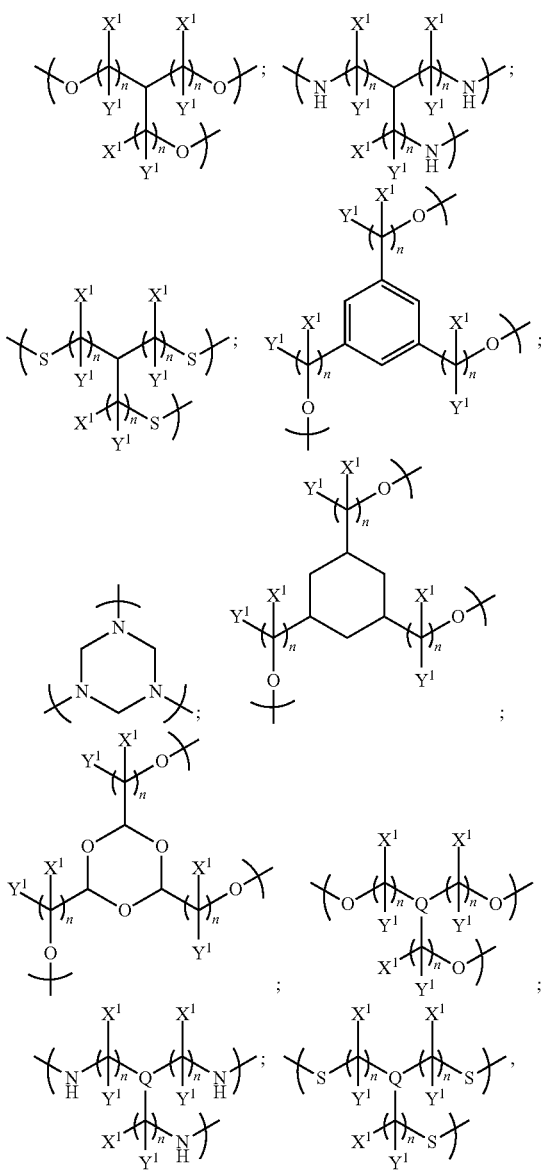

where each n independently=1, 2, 3, 4, 5, 6, 7, or 8,
Q is nitrogen (N) or phosphorus (P), and
each of $X^1$ and $Y^1$ is independently selected from the group consisting of: a hydrogen atom (H) and an alkyl group, and/or a pair of $X^1$ and $Y^1$ on the same carbon, taken together, is an oxo group.

In other examples, the at least one further colorant moiety comprises a third colorant moiety having a third net dipole and a fourth colorant moiety having a fourth net dipole, and the linker may be tetravalent for linking the first, second, third and fourth colorant moieties. The linker may be tetravalent for only linking the first, second, third and fourth colorant moieties, or the linker may have at least one further valency for bonding to at least one non-colorant moiety.

In some examples, the linker links the first, second, third and fourth colorant moieties in a disposition around the linker such that the first, second, third and fourth net dipoles at least partially cancel each other. In some examples each one of the first, second, third and fourth net dipoles are disposed around the linker to at least partially cancel each other of the first, second, third and fourth net dipoles; for example, each colorant moiety may be disposed around the linker such that each net dipole is spaced equally from the other net dipoles, and so the orientation of the net dipoles is such that they at least partially cancel each other. The colorant moieties may be disposed within the same plane, or may be disposed in three dimensional space.

In further examples, the linker is selected from the group consisting of:

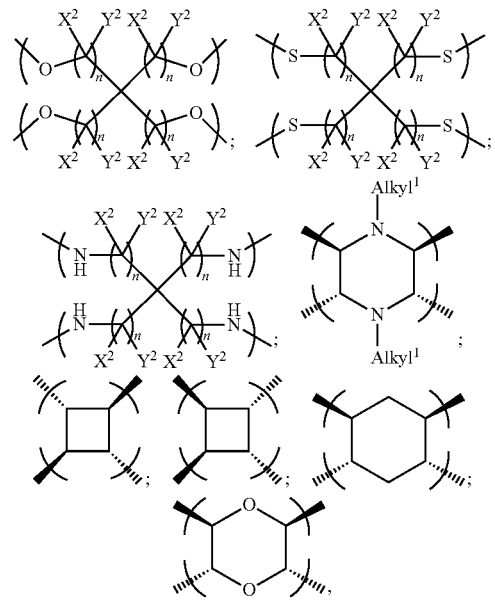

where each n independently=1, 2, 3, 4, 5, 6, 7 or 8, and
each of $X^2$ and $Y^2$ is independently selected from the groups consisting of: hydrogen (H) and an alkyl group, and/or a pair of $X^2$ and $Y^2$ on the same carbon, taken together, is an oxo group, and alkyl$^1$ is an alkyl group having one or more carbon atoms, for example 1 to 32 carbon atoms.

In some examples, the third colorant moiety and the fourth colorant moiety are disposed around the linker so that the third net dipole and the fourth net dipole are at least partially opposed to each other; thus the third and fourth net dipoles may at least partially cancel each other. This may be in addition to the first and second colorant moieties being disposed around the linker so the first net dipole and the second net dipole are at least partially opposed to each other.

In some embodiments, when the compound is depicted with an idealised geometry, the compound is symmetric in at least one plane bisecting a centre of the linker. For example, the plane of symmetry may be a reflective symmetry plane dividing the compound into two halves, each half being a mirror image of the other half; in this way, the net dipoles of colorant moieties in one half at least partially cancel the net dipoles of colorant moieties in the other half. In other examples, the compound may be rotationally symmetric in at least one plane, and in further examples the compound may be both reflectively and rotationally symmetric.

The colour properties of the compound depend on the colorant moieties selected. In some examples, each of the plurality of colorant moieties is the same colorant moiety. In such examples, it may therefore be easier to achieve at least partial cancellation of a net dipole of each colorant moiety, since each net dipole is the same. In other examples, at least one of said plurality of colorant moieties is different from another one of said plurality of colorant moieties. In such examples different colorant moieties may be selected for linking by the linker, to tune the colour property to that desired of the compound.

In some embodiments, the compound is a dye.

In examples, at least one of the plurality of colorant moieties is of a dye class selected from the group consisting of:

an azo dye having the general formula:

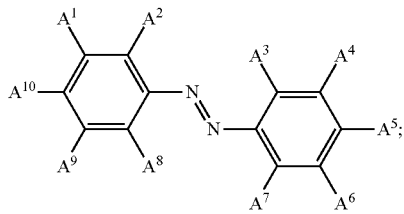

a bisazo dye having the general formula:

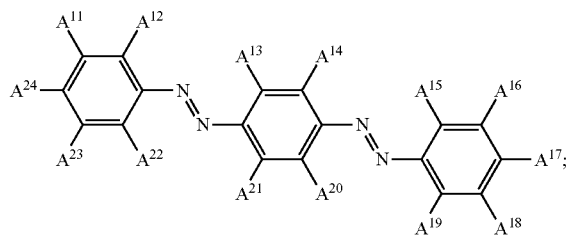

an anthraquinone dye having the general formula:

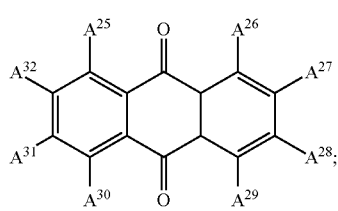

a coumarine dye having the general formula:

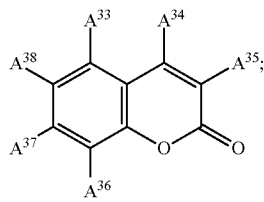

a naphthaquinone dye having the general formula:

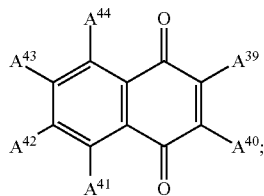

a squaraine dye having the general formula:

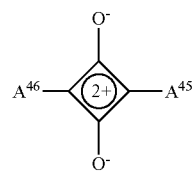

a stilbene dye having the general formula:

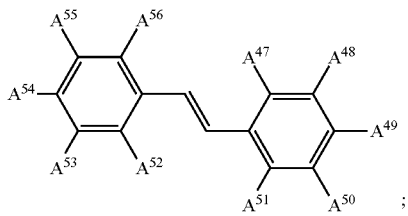

and
an indophenol dye having the general formula:

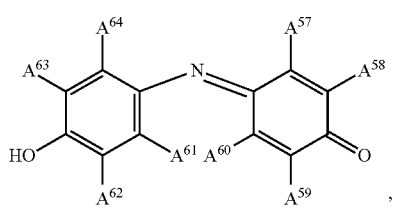

wherein each of $A^1$ to $A^{64}$ is independently selected from the group consisting of: a linker in accordance with any linker described herein, hydrogen (H), an alkyl group having one or more carbon atoms for example 1 to 32 carbon atoms, a halogen atom, an alkyl group, an alkenyl group, an oxo group, an alkoxy group, a thiol group, a hydroxyl group, a thioalkyl group, an aryl group, a heteroaryl group, an amine group, a nitro group, a cyano group, an amide group, a sulphonyl group, a carboxy group, a trifluoromethyl group.

In some examples, at least one of the plurality of colorant moieties is an azo dye having a formula selected from the group consisting of:

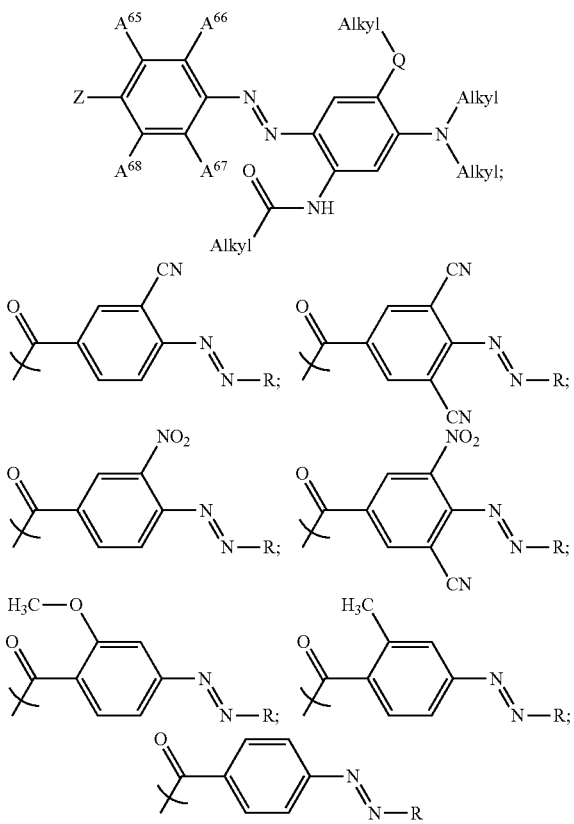

wherein each Alkyl is independently an alkyl group having one or more carbon atoms, for example 1 to 32 carbon atoms,

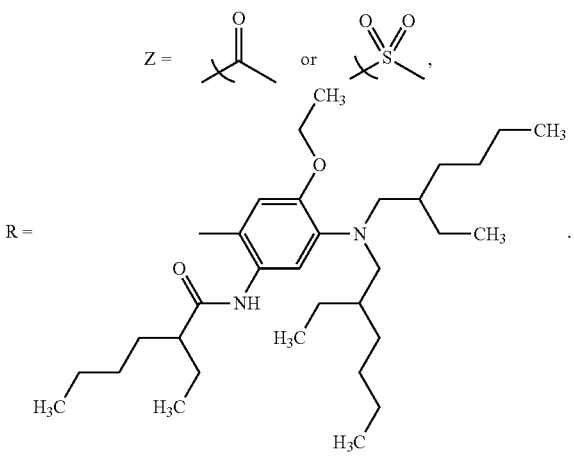

and each of $A^{65}$ to $A^{68}$ is independently selected from the group consisting of: a linker in accordance with any linker described herein, hydrogen (H), an alkyl group comprising one or more carbon atoms for example 1 to 32 carbon atoms, a halogen atom, an alkyl group, an alkenyl group, an oxo group, an alkoxy group, a thiol group, a hydroxyl group, a thioalkyl group, an aryl group, a heteroaryl group, an amine group, a nitro group, a cyano group, an amide group, a sulphonyl group, a carboxy group, a trifluoromethyl group.

Examples of substituent groups and atoms described herein will now be described:

Any alkyl group referred to herein includes any isomer of a straight chained, branched or cyclic alkyl group. In examples, there are one or more carbon atoms in the alkyl group, for example within the range of 1 to 32 carbon atoms, and in other examples within the range of carbon atoms of $C_1$ to $C_{10}$, i.e. 1, 2, 3, 4, 5, 6, 7, 8, 9 or 10 carbon atoms.

Any halogen atom referred to herein includes any of fluorine (F), chlorine (Cl), bromine (Br) and iodine (I); in some examples a halogen atom is F or Cl.

Any alkenyl group referred to herein includes any isomers of a straight chained, branched or cyclic alkenyl group. In examples, there are one or more carbon atoms in the alkenyl group, for example within the range of 1 to 32 carbon atoms, and in other examples within the range of carbon atoms of $C_1$ to $C_{10}$, i.e. 1, 2, 3, 4, 5, 6, 7, 8, 9 or 10 carbon atoms. Such alkenyl groups may include one or more —C═C— bonds, for example 1, 2, 3, 4, 5, 6, 7, 8, 9 or 10 —C═C— bonds.

Any aryl group referred to herein includes any aromatic hydrocarbon group having six or more carbon atoms, for example any aromatic hydrocarbon having $C_6$ to $C_{10}$ carbon atoms, i.e. 6, 7, 8, 9 or 10 carbon atoms. Further, any such aryl group may be substituted on at least one aromatic carbon by for example, as defined herein, an alkyl group as defined herein, a halogen atom as defined herein, an alkenyl group as defined herein, an alkoxy group as defined herein, a thioalkyl group as defined herein, an oxo group as defined herein, an acetal group as defined herein or a thioacetal group as defined herein.

Any alkoxy group referred to herein includes any isomer of an alkoxy group, i.e. an alkyl group, bonded to an oxygen, having one or more carbons, for example any isomer of an alkoxy having a number of carbon atoms in the range of 1 to 32, and in other examples a number of carbon atoms in the range of $C_1$ to $C_{10}$, i.e. 1, 2, 3, 4, 5, 6, 7, 8, 9 or 10 carbon atoms.

Any thioalkyl group referred to herein includes any isomer of a thioalkyl group, i.e. an alkyl group, bonded to a sulphur, having one or more carbons, for example any isomer of a thioalkyl having a number of carbon atoms in the range of 1 to 32, and in other examples a number of carbon atoms in the range of $C_1$ to $C_{10}$, i.e. 1, 2, 3, 4, 5, 6, 7, 8, 9 or 10 carbon atoms.

An acetal group referred to herein includes two alkyl groups or an alkanediyl group bonded to each of two oxygen atoms.

An alkanediyl group referred to herein is a divalent radical group with the formula —$(CH_2)_{n1}$— where n1 is one or more, for example having an integer value in the range 1 to 32, and in some embodiments having an integer value in the range 1 to 10, i.e. 1, 2, 3, 4, 5, 6, 7, 8, 9 or 10. Such an alkanediyl may be straight chained or branched.

A thioacetal group referred to herein includes two alkyl groups or an alkanediyl group bonded to each of two sulphur atoms.

A thiol group referred to herein is the group SH.

An oxo group referred to herein is the group ═O. When bonded to a carbon atom this therefore provides a carbonyl group C═O.

A hydroxyl group referred to herein is the group —OH.

A heteroaryl group referred to herein includes any aromatic hydrocarbon group with at least one heteroatom, for example nitrogen (N) or oxygen (O) conjugated in the aromatic system. The aromatic hydrocarbon group may include one or more carbon atoms, for example in the range $C_1$ to $C_{10}$, i.e. 1, 2, 3, 4, 5, 6, 7, 8, 9 or 10 carbon atoms.

An amine group referred to herein includes any primary, secondary or tertiary amine, i.e. —$NH_2$ substituted respectively with zero, one or two alkyl or aryl groups as defined herein.

A nitro group referred to herein is the group —$NO_2$, i.e. including a nitrogen atom bonded to two oxygen atoms.

A cyano group referred to herein is the group —CN, i.e. a carbon atom bonded with a triple bond to a nitrogen.

An amide group referred to herein is a group with a nitrogen bonded to a carboxy group, with the nitrogen being further substituted by two of a hydrogen atom, an alkyl group or an aryl group defined herein; i.e. —$CON(AG)_2$ where AG indicates an alkyl or aryl group defined herein.

A sulphonyl group referred to herein is a group with a sulphur atom bonded to two oxygen atoms via two double bonds. The sulphur atom is further bonded by a single bond to a hydrocarbon group such as an alkyl or an aryl group labelled AG and defined herein; i.e. —$SO_2(AG)$.

A carboxyl group referred to herein is the group COOH.

A trifluoromethyl group referred to herein is the group —$CF_3$.

It has been found that in addition to backflow reducing properties, some compounds described herein have desirable colour properties for an electrowetting display device and desirable lifetime properties, for example being resistant to photo-bleaching effects. Moreover, compounds described herein have a suitable solubility for dissolving in the first fluid; the solubility may be adjusted in dependence on the length of alkyl groups on the colorant moieties, for example. Compounds described herein therefore are found to have properties well suited for use in the first fluid of electrowetting apparatus.

The compounds described above may be synthesised using coupling methods known in the art. For example, a linker precursor may be a polyol or a polyamine; for example the linker precursor for the linker

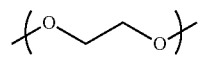

may be $HOCH_2CH_2OH$. The colorant moiety to be linked may have a carboxyl group, a halogen atom, a cyano group, an amine group, a hydroxyl group or a sulphonate group at the site to be linked. A method such as esterification, amidification, thioesterification, or etherification, may be used to link the linker and colorant moieties. Other techniques may include a cross coupling reaction, Friedel-Craft acylation or alkylation, or diazo coupling.

A general example of esterification is:

Where linker L is —O—$(CH_2)_2$—O— and colorant moiety is represented as CM for example, then the linker precursor may be HO—$(CH_2)_2$—OH and the colorant moiety to be linked may be represented by $R_{CM}$—COOH, where $R_{CM}$ is the rest of the colorant moiety structure. An acid catalysed nucleophilic substitution reaction may be used for example to generate the compound $R_{CM}$—CO—O—$(CH_2)_2$—O—CO—$R_{CM}$.

Alternatively, linking can be achieved via the corresponding acid chloride or active ester as is known in the art.

A general example of amidification is:

Where linker L is —NH—$(CH_2)_2$—NH— and colorant moiety is represented as CM for example, then the linker precursor may be $H_2N$—$(CH_2)_2$—$NH_2$ and the colorant moiety to be linked may be represented by $R_{CM}$—COOH, where $R_{CM}$ is the rest of the colorant moiety structure. An acid catalysed nucleophilic substitution reaction may be used for example to generate the compound $R_{CM}$—CO—NH—$(CH_2)_2$—NH—CO—$R_{CM}$.

Alternatively, linking can be achieved via the corresponding acid chloride or active ester as is known in the art.

An general example of thioesterification is:

Where linker L is —S—$(CH_2)_2$—S— and colorant moiety is represented as CM for example, then the linker precursor may be HS—$(CH_2)_2$—SH and the colorant moiety to be linked may be represented by $R_{CM}$—COOH, where $R_{CM}$ is the rest of the colorant moiety structure. An acid catalysed nucleophilic substitution reaction may be used for example to generate the compound $R_{CM}$—CO—S—$(CH_2)_2$—S—CO—$R_{CM}$.

Alternatively, linking can be achieved via the corresponding acid chloride or active ester as is known in the art.

Further, where the linker bonds to the colorant moieties using an alkyl group, the linker may be coupled with the colorant moieties by cross coupling reaction, Friedel-Craft reaction, or nucleophile aromatic substitution.

Further examples of methods for synthesising the compounds described herein may be found for example in the book "March's Advanced Organic Chemistry: Reactions, Mechanisms and Structure", $6^{th}$ Edition, Michael B Smith and Jerry March, ISBN 13:978-0-471-72091-1, the contents of which is incorporated herein by reference.

Figure 3:
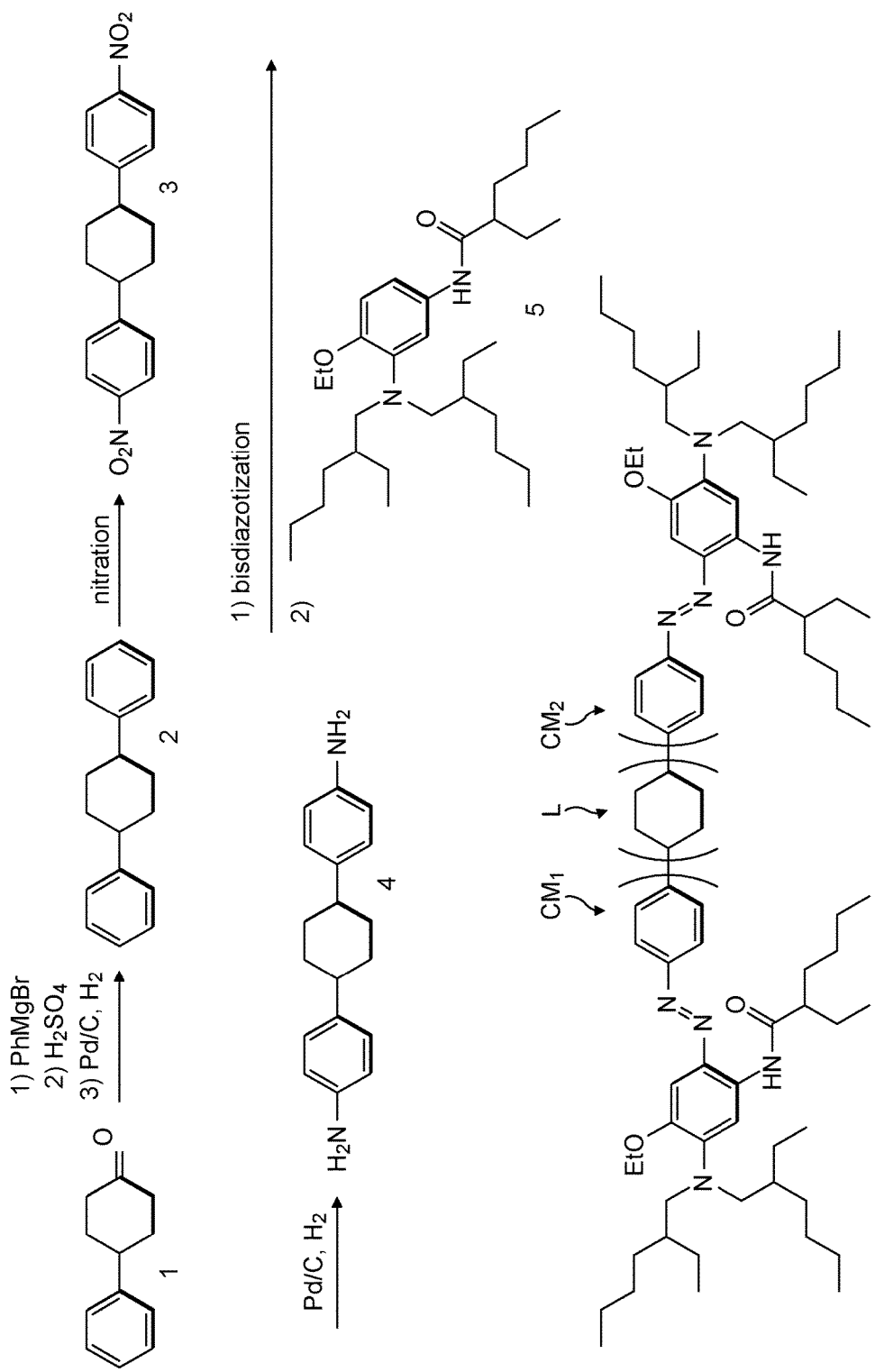
FIG. 3 shows schematically a synthesis method of a compound according to an embodiment.

It is further envisaged that a linker precursor may be synthesised with one colorant moiety already linked; a subsequent reaction may be used to bond further colorant moieties to the linker. In other examples, the linker may be synthesised with at least part of one colorant moiety linked; for example, where each colorant moiety is an azo, the azo groups may be formed after the part of the colorant moiety on one side of the azo group to be formed has been linked to the linker; another example of such a synthesis is illustrated in FIG. 3 where the linker is a cyclohexyl linker.

Specific dye compounds examples will now be described.

Example 1

In this example the linker is

which links two colorant moieties with the structure

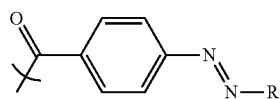

where

R =
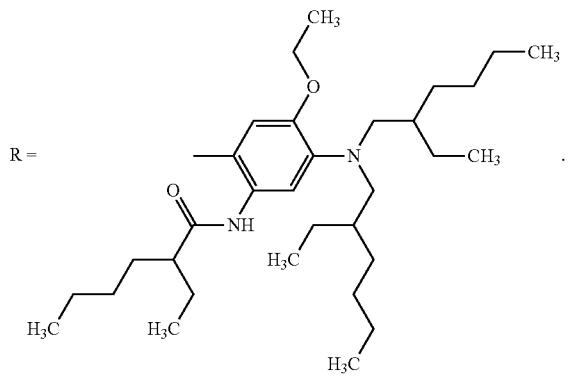 [SMILES: CCCCC(CC)CN(CC(CC)CCCC)c1cc(NC(=O)C(CC)CCCC)c(C)cc1OCC]

This compound shows a 98% reduction in backflow when dissolved in the first fluid of electrowetting apparatus such as that described above, compared with the same apparatus but with the unlinked colorant moiety dissolved in the first fluid. This dye compound has a peak light absorption of 501 nanometers.

The dye compound, namely N,N'-(((1E,1'E)-((Piperazine-1,4-dicarbonyl)bis(4,1-phenylene))bis(diazene-2,1-diyl))bis(3-(bis(2-ethylhexyl)amino)-4-ethoxy-6,1-phenylene))bis(2-ethylhexanamide), may be synthesised by the following method:

4-[(E)-2-{4-[bis(2-ethylhexyl)amino]-5-ethoxy-2-(2-ethylhexanamido)phenyl}diazen-1-yl]benzoic acid (1.0 g, 1.5 mmol), oxalyl chloride (0.26 ml, 0.39 g, 3.07 mmol) and N,N-dimethylformamide (DMF) (1 drop) were dissolved in cold dichloromethane (DCM) (25 mL) under a nitrogen atmosphere. After the ice-water bath was removed, the solution was stirred for 2 hours at ambient temperature. The purple mixture was concentrated in vacuo and the residue was stripped with (DCM) (2×, 20 mL). The residue was dissolved in DCM (20 mL), piperazine (52 mg, 0.6 mmol) and N,N-diisopropylethylamine (DIPEA) (2.5 mL, 1.94 g, 15 mmol) were added. After stirring the mixture was stirred for 64 hours at ambient temperature, it was concentrated in vacuo, leaving the target compound (620 mg, 0.486 mmol; 61%) as a red solid after purification by column chromatography (using silica gel(SiO$_2$) with heptanes/ethyl acetate (EtOAc)=100→94/6)

Example 2

In this example the linker is

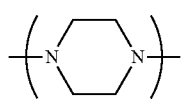

which links two colorant moieties with the structure

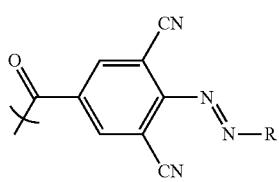

where

R =
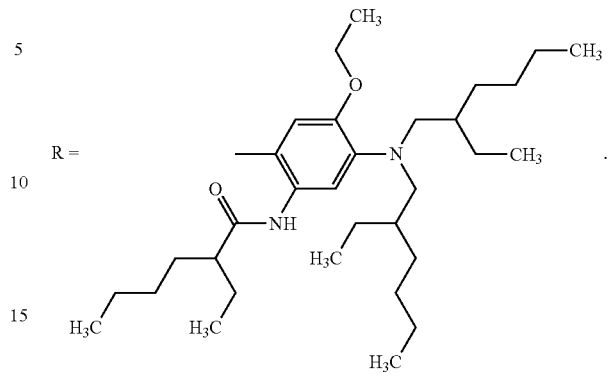

This compound shows a 98% reduction in backflow when dissolved in the first fluid of electrowetting apparatus such as that described above, compared with the same apparatus but with the unlinked colorant moiety dissolved in the first fluid. This dye compound has a peak light absorption of 628 nanometers.

The dye compound, namely N,N'-(((1E,1'E)-((piperazine-1,4-dicarbonyl)bis(2,6-dicyano-4,1-phenylene))bis(diazene-2,1-diyl))bis(3-(bis(2-ethylhexyl)amino)-4-ethoxy-6,1-phenylene))bis(2-ethylhexanamide), may be synthesised by the following method:

4-[(E)-2-{4-[bis(2-ethylhexyl)amino]-5-ethoxy-2-(2-ethylhexanamido)phenyl}diazen-1-yl]-3,5-dicyanobenzoic acid (1.8 g, 2.5 mmol), piperazine (111 mg, 1.28 mmol, 0.5 eq.) and Et$_3$N (0.90 mL, 6.4 mmol, 2.5 eq.) were stirred in DMF (30 mL) and 50% propane phosphonic acid anhydride (T$_3$P) in DMF (6 mL) was added dropwise. After 6 days, TLC revealed almost complete conversion and the mixture was poured in water (200 mL) and was extracted with toluene (3×100 mL). The combined organic layers were washed with water (3×100 mL), dried over sodium sulphate (Na$_2$SO$_4$) and concentrated to give crude amide. The obtained material was filtered over a glass filter with 75 mL SiO$_2$ (first DCM to remove minor impurities, then DCM with 1% isopropyl alcohol (IPA) to isolate the product) to give pure amide (1.6 g, 86%).

Example 3

In this example the linker is

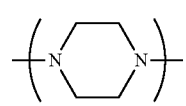

which links two colorant moieties with the structure

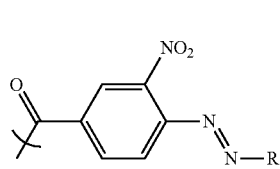

where

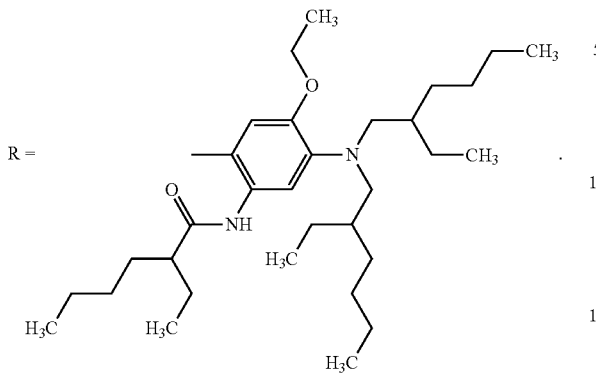

This compound shows a 57% reduction in backflow when dissolved in the first fluid of electrowetting apparatus such as that described above, compared with the same apparatus but with the unlinked colorant moiety dissolved in the first fluid. This dye compound has a peak light absorption of 550 nanometers.

The dye compound, namely N,N'-(((1E,1'E)-((piperazine-1,4-dicarbonyl)bis(2-nitro-4,1-phenylene))bis(diazene-2,1-diyl))bis(3-(bis(2-ethylhexyl)amino)-4-ethoxy-6,1-phenylene))bis(2-ethylhexanamide), may be synthesised as follows:

Oxalyl chloride (6.40 g, 50.4 mmol) was added to an ice-cooled solution of 4-[(E)-2-{4-[bis(2-ethylhexyl)amino]-5-ethoxy-2-(2-ethylhexanamido)phenyl}diazen-1-yl]-3-nitrobenzoic acid (7.13 g, 10.25 mmol). The mixture was stirred for 15 min in ice, then for 2 h at Room Temperature. 30% of the solution (i.e. 3.08 mmol acid chloride) was taken out and rotary evaporated. The residue was dissolved in 20 mL dichloromethane, and diisopropylethylamine (5.0 g, 38.76 mmol) and piperazine (86 mg, 1.0 mmol) were added. The mixture was stirred for 3 days and then rotary evaporated at 60° C. To the residue there were added 100 mL toluene and 50 mL water. The layers were separated, the organic layer was washed with 50 mL water, and the successive aqueous layers were extracted with 100 mL toluene. Drying, rotary evaporation and chromatography on silica gel, using heptane with increasing amounts of ethyl acetate as the eluent, yielded the desired product (0.89 g, 0.62 mmol, 62% based on piperazine).

Example 4

In this example the linker is

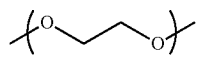

which links two colorant moieties with the structure

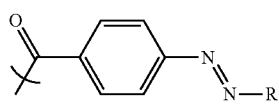

where

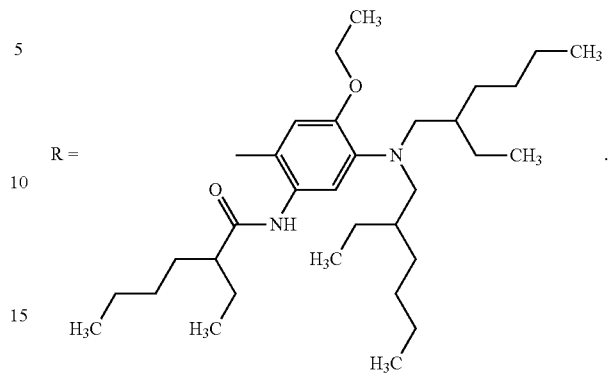

This dye compound has a peak light absorption of 506 nanometers.

The dye compound, namely (E)-N,N'-(ethane-1,2-diyl)bis (4-((E)-(4-(bis(2-ethylhexyl)amino)-5-ethoxy-2-(2-ethylhexanamido)phenyl)diazenyl)benzamide), may be synthesised as follows:

To a solution of N,N'-(((1E,1'E)-((Piperazine-1,4-dicarbonyl)bis(4,1-phenylene))bis(diazene-2,1-diyl))bis(3-(bis(2-ethylhexyl)amino)-4-ethoxy-6,1-phenylene))bis(2-ethylhexanamide) (3.5 g, 5.38 mmol) in DCM (80 mL) at 0° C. was added a drop of DMF and oxalyl chloride (1 mL, 11.98 mmol). The mixture was stirred 2 h at room temperature under a nitrogen atmosphere ($N_2$) and then concentrated under vacuum. To remove the excess of oxalyl chloride, DCM (50 mL) was added to the mixture and remove under vacuum (2×).

A sample of the previous product (1.0 mmol) was dissolved in DCM (15 mL) and DIPEA (3.3 mL, 20 mmol) was added followed by ethylenediamine (15 mg, 0.25 mmol). The mixture was stirred at room temperature for 5 days and concentrated under vacuum. Purification by column chromatography ($SiO_2$, heptane to heptane/EtOAc 2/1 then a new column with heptane/methyl tert-butyl ether (TBME) 30/7) gave target compound (200 mg, 60% yield).

Example 5

In this example the linker is

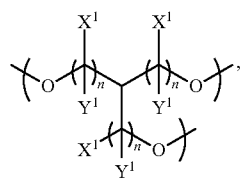

where each $X^1$ and $Y^1$ is a hydrogen atom and n=1, which links three colorant moieties with the structure

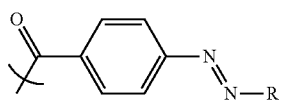

where

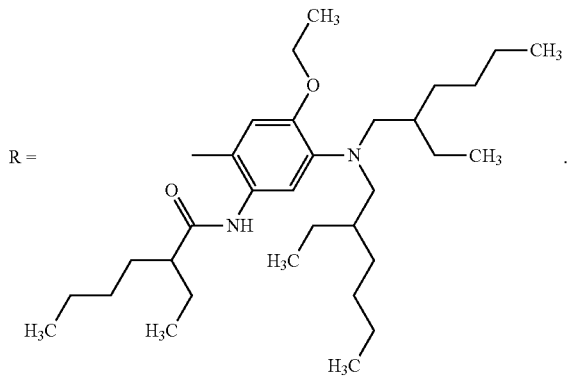 [SMILES: CCCCC(CC)CN(CC(CC)CCCC)c1cc(NC(=O)C(CC)CCCC)c(C)cc1OCC]

This dye compound has a peak light absorption of 508 nanometers.

The dye compound, namely (E)-2-(((4-((E)-(4-(bis(2-ethylhexyl)amino)-5-ethoxy-2-(2-ethylhexanamido)phenyl)diazenyl)benzoyl)oxy)methyl)propane-1,3-diyl bis(4-((E)-(4-(bis(2-ethylhexyl)amino)-5-ethoxy-2-(2-ethylhexanamido)phenyl)diazenyl)benzoate), may be synthesised as follows:

To a solution of N,N'-(((1E,1'E)-((Piperazine-1,4-dicarbonyl)bis(4,1-phenylene))bis(diazene-2,1-diyl))bis(3-(bis(2-ethylhexyl)amino)-4-ethoxy-6,1-phenylene))bis(2-ethylhexanamide) (1.8 g, 2.8 mmol) in tetrahydrofuran (THF) (3 mL) and pyridine (2 mL) was added 4-dimethylaminopyridine (DMAP) (337 mg, 2.8 mmol) and N,N'-dicyclohexylcarbodiimide (DCC) (1.25 g, 6.1 mmol). The mixture was stirred 15 minutes at room temperature then triol (64 mg, 0.6 mmol) was added and the mixture was stirred 2 days at 50° C. The solvents were removed under vacuum. Purification by column chromatography (SiO$_2$, heptane/EtOAc 10/1) afforded target compound (1 g, 83% yield).

Example 6

In this example the linker is,

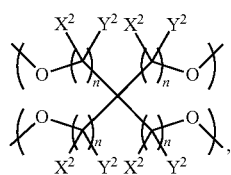

where each $X^2$ and $Y^2$ is a hydrogen atom and n=1, which links four colorant moieties with the structure

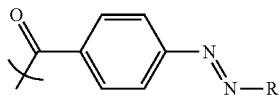

where

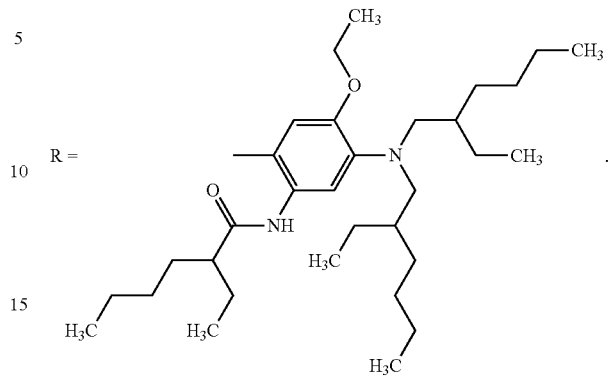

This dye compound has a peak light absorption of 514 nanometers.

The dye compound, namely (E)-2,2-bis-(((4-((E)-(4-(bis(2-ethylhexyl)amino)-5-ethoxy-2-(2-ethylhexanamido)phenyl)diazenyl)benzoyl)oxy)methyl)propane-1,3-diyl bis(4-((E)-(4-(bis(2-ethylhexyl)amino)-5-ethoxy-2-(2-ethylhexanamido)phenyl)diazenyl)benzoate), may be synthesised as follows:

To a solution of the N,N'-(((1E,1'E)-((Piperazine-1,4-dicarbonyl)bis(4,1-phenylene))bis(diazene-2,1-diyl))bis(3-(bis(2-ethylhexyl)amino)-4-ethoxy-6,1-phenylene))bis(2-ethylhexanamide) (4.5 g, 6.9 mmol) in THF (10 mL) and pyridine (3 mL) was added DMAP (844 mg, 6.9 mmol) and DCC (3.1 g, 15.2 mmol). The mixture was stirred 15 minutes at room temperature then pentaerythritol (136 mg, 1.0 mmol) was added and the mixture was stirred 6 days at 50° C. The solvents were removed under vacuum. Purification by column chromatography (SiO$_2$, heptane/EtOAc 30/1 to 10/1) afforded target compound (2.5 g) as a dark magenta oil which solidified while cooling.

Example 7

In this example the linker is

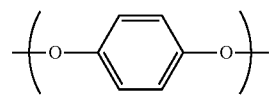

which links two colorant moieties with the structure

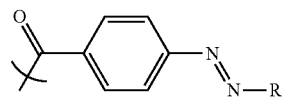

where

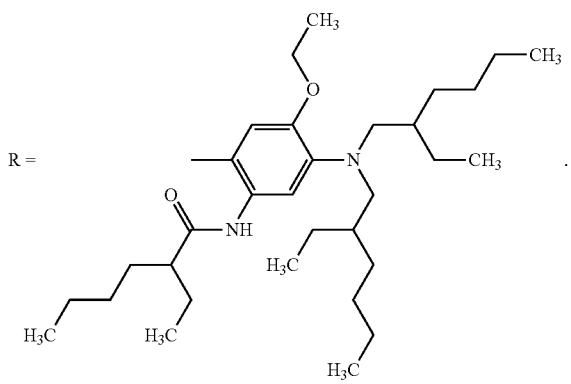

This dye compound has a peak light absorption of 518 nanometers.

The dye compound, namely (E)-1,4-phenylene bis(4-((E)-(4-(bis(2-ethylhexyl)amino)-5-ethoxy-2-(2-ethylhexanamido)phenyl)diazenyl)benzoate), may be synthesised as follows:

To a solution of N,N'-(((1E,1'E)-((Piperazine-1,4-dicarbonyl)bis(4,1-phenylene))bis(diazene-2,1-diyl))bis(3-(bis(2-ethylhexyl)amino)-4-ethoxy-6,1-phenylene))bis(2-ethylhexanamide) (3.5 g, 5.38 mmol) in DCM (80 mL) at 0° C. was added a drop of DMF and oxalyl chloride (1 mL, 11.98 mmol). The mixture was stirred 2 h at room temperature under $N_2$ and then concentrated under vacuum. To remove the excess of oxalyl chloride, DCM (50 mL) was added to the mixture and remove under vacuum (2×).

The mixture was dissolved in THF (20 mL) and cooled with an ice-water bath. Pyridine (30 mL), hydroquinone (264 mg, 2.4 mmol) and DMAP (600 mg, 4.9 mmol) were added. The mixture was stirred at room temperature for 2 h then at 80° C. (ext.) for 2 days. The solution was concentrated and the crude mixture was diluted with DCM and silica gel was added and the DCM removed under vacuum. Purification by column chromatography ($SiO_2$, heptane/EtOAc 80/1 to 30/1 then a new column with heptane/TBME 30/7) gave target compound (1.6 g) as a dark magenta viscous oil.

The above embodiments are to be understood as illustrative examples. Further embodiments are envisaged. For example, it is envisaged that any stereoisomer of the compounds described herein may be applied in a first fluid of the electrowetting apparatus, to reduce backflow. Further, although embodiments may relate to dendrimers, compounds of some embodiments are not dendrimers as: there is one linker and no other branching points for colorant moieties; there are no more than four colorant moieties; and/or there is only one colorant moiety per arm of the compound, each arm stemming from the linker.

Numerical ranges are given herein. For example the range 1 to 32 is to be understood to be an explicit disclosure of all integer values within that range, for example 3. For the range of 135 to 220 degrees given, it is to be understood this is an explicit disclosure of all numerical values within the range, for example 180, 170, 165.5.

Although compounds are described above in the context of being dissolved in a first fluid of an electrowetting apparatus, it is envisaged that the compounds may be applied more broadly, to potentially any technology other than that using electrowetting. In further examples, the compound may be provided in a fluid of an electrowetting apparatus different from that described above, such as electrowetting apparatus comprising a support plate on which the fluid is provided and an electrode arranged relative to the fluid such that applying an electrical potential to the electrode changes a configuration of the fluid; an example of such apparatus may be an electrowetting lens, an electrowetting optical filter or a lab on chip device using electrowetting.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the accompanying claims.

What is claimed is:

1. An electrowetting element comprising a dye compound comprising:
   a plurality of dye colorant moieties comprising:
      a first dye colorant moiety having a first net dipole, and
      a second dye colorant moiety having a second net dipole; and
   a linker, the plurality of dye colorant moieties linked by and disposed around the linker so that the first net dipole and the second net dipole at least partially cancel each other, the linker having at least one of:
(i) a general formula selected from the group consisting of:

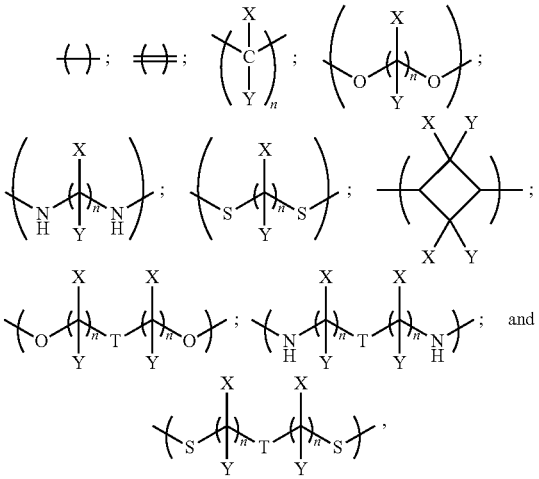

wherein each n independently=one or more of 1, 2, 3, 4, 5, 6, 7 or 8;
one or more of the following applies:
   X and Y are each independently selected from the group consisting of: hydrogen (H), a halogen atom, an alkyl group, an alkenyl group, an aryl group, an alkoxy group, and a thioalkyl group, or
   a pair of X and Y on the same carbon, taken together, is one or more of: an oxo group, an acetal group, or a thioacetal group; and
   T is one or more of: oxygen (O), or sulphur (S);
(ii) a formula selected from the group consisting of:

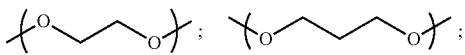

-continued

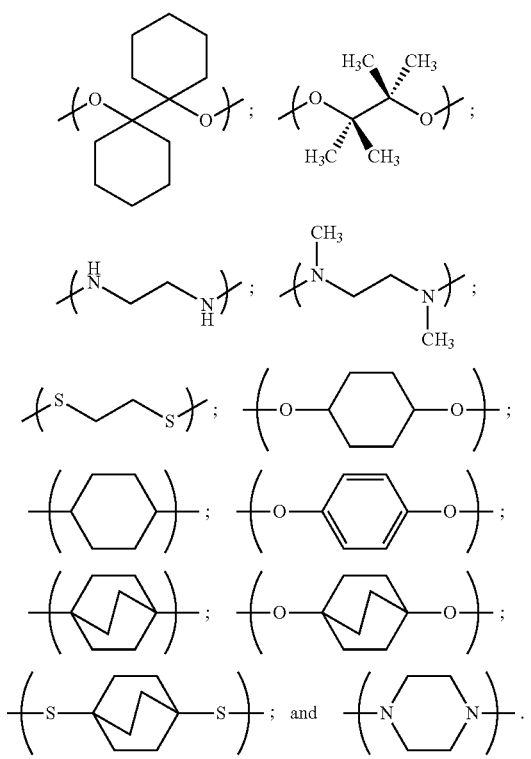

(iii) a formula selected from the group consisting of:

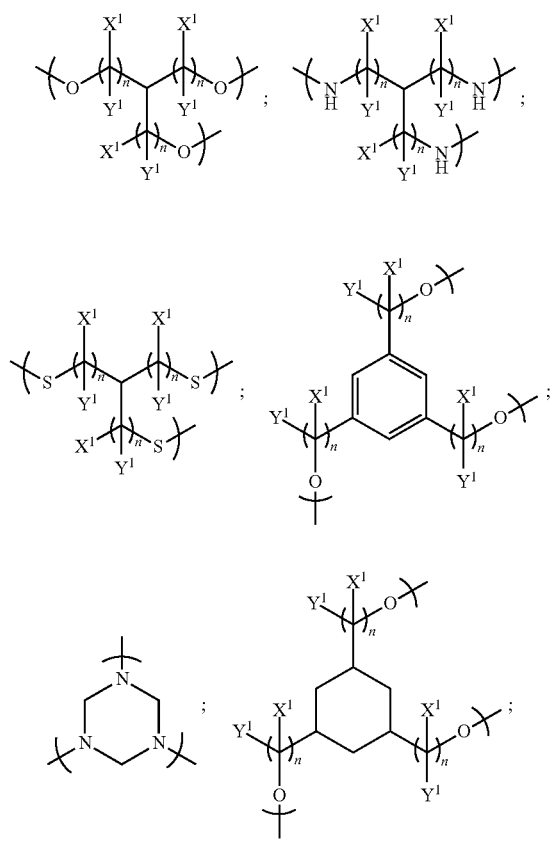

-continued

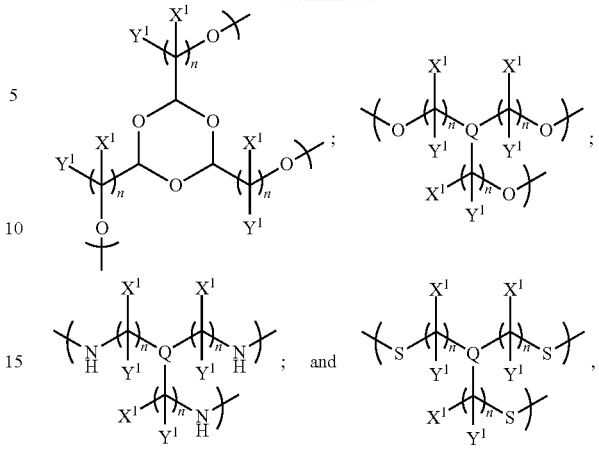

wherein each n independently=one or more of: 1, 2, 3, 4, 5, 6, 7, or 8;
Q is one or more of: N or P; and
one or more of the following applies:
  each of $X^1$ and $Y^1$ is independently selected from the group consisting of: a hydrogen atom (H) and an alkyl group, or
  a pair of $X^1$ and $Y^1$ on the same carbon, taken together, is an oxo group;
or
(iv) a formula selected from the group consisting of:

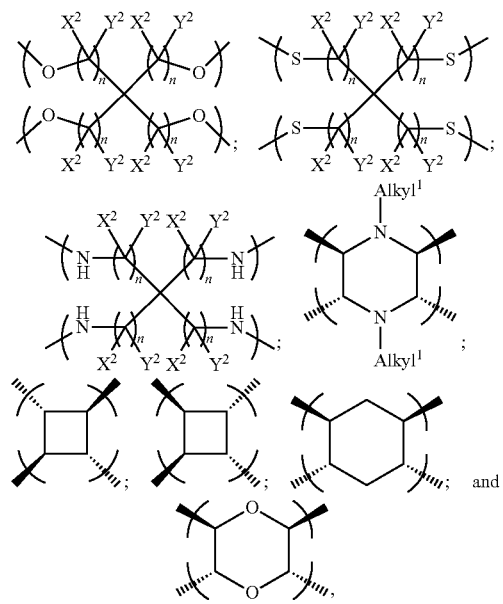

wherein each n independently=one or more of: 1, 2, 3, 4, 5, 6, 7 or 8;
one or more of the following applies:
  each of $X^2$ and $Y^2$ is independently selected from the group consisting of: H and an alkyl group, or
  a pair of $X^2$ and $Y^2$ on the same carbon, taken together, is an oxo group; and
alkyl$^1$ is one or more of: an alkyl group having at least one carbon atom, or an alkyl group having 1 to 32 carbon atoms.

2. The electrowetting element according to claim 1, wherein one or more of the following applies:
   each of the plurality of dye colorant moieties comprises at least one chromophore,
   the plurality of dye colorant moieties are disposed around the linker so that a net dipole of the dye compound is substantially zero, or
   the dye compound reduces backflow by at least one or more of: 50%, 60%, 70%, 80%, 90%, 95%, or 98%.

3. The electrowetting element according to claim 1, wherein the first dye colorant moiety and the second dye colorant moiety are disposed around the linker so that the first net dipole and the second net dipole are at least partially opposed to each other.

4. The electrowetting element according to claim 3, wherein the plurality of dye colorant moieties comprises only the first dye colorant moiety and the second dye colorant moiety, wherein, with the dye compound having a substantially linear geometry, the first net dipole and the second net dipole are substantially coincident along a linear axis.

5. The electrowetting element according to claim 1, the plurality of dye colorant moieties comprising at least one further dye colorant moiety having at least one further net dipole, wherein the plurality of dye colorant moieties are disposed around the linker so that the first net dipole, the second net dipole and the at least one further net dipole at least partially cancel each other.

6. The electrowetting element according to claim 5, wherein the at least one further dye colorant moiety comprises a third dye colorant moiety having a third net dipole.

7. The electrowetting element according to claim 6, and in accordance with (iii), wherein the linker is trivalent for linking the first dye colorant moiety, the second dye colorant moiety and the third dye colorant moiety.

8. The electrowetting element according to claim 7, wherein the linker links the first dye colorant moiety, the second dye colorant moiety and the third dye colorant moiety in a disposition around the linker such that the first net dipole, the second net dipole and the third net dipole at least partially cancel each other.

9. The electrowetting element according to claim 5, wherein the at least one further dye colorant moiety comprises a third dye colorant moiety having a third net dipole and a fourth dye colorant moiety having a fourth net dipole.

10. The electrowetting element according to claim 9, and in accordance with (iv), wherein the linker is tetravalent for linking the first dye colorant moiety, the second dye colorant moiety, the third dye colorant moiety and the fourth dye colorant moiety.

11. The electrowetting element according to claim 10, wherein the linker links the first dye colorant moiety, the second dye colorant moiety, the third dye colorant moiety and the fourth dye colorant moiety in a disposition around the linker such that the first net dipole, the second net dipole, the third net dipole and the fourth net dipole at least partially cancel each other.

12. The electrowetting element according to claim 1, wherein one or more of the following applies:
   a geometry of the dye compound is configurable such that the dye compound is symmetric in at least one plane bisecting a centre of the linker,
   the linker is substantially planar,
   at least one of the plurality of dye colorant moieties is substantially planar,
   the linker comprises a cyclic group,
   each of the plurality of dye colorant moieties is the same dye colorant moiety, or
   at least one of the plurality of dye colorant moieties is different from another one of the plurality of dye colorant moieties.

13. The electrowetting element according to claim 1, wherein at least one of the plurality of dye colorant moieties is of a dye class selected from the group consisting of: an azo dye having the general formula:

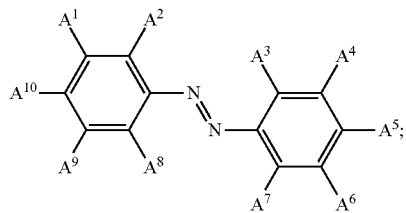

a bisazo dye having the general formula:

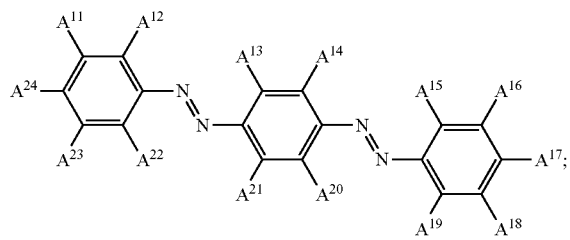

an anthraquinone dye having the general formula:

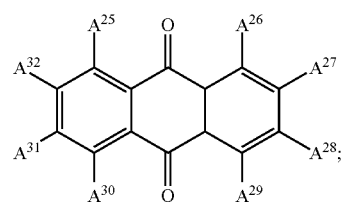

a coumarine dye having the general formula:

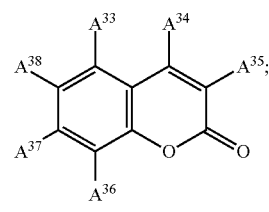

a naphthaquinone dye having the general formula:

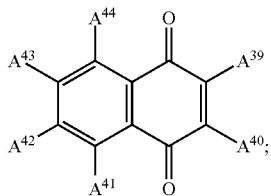

a squaraine dye having the general formula:

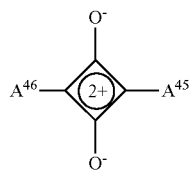

a stilbene dye having the general formula:

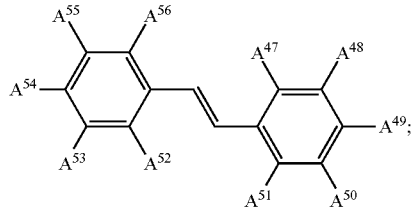

and
an indophenol dye having the general formula:

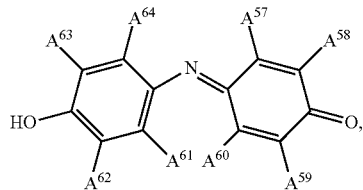

wherein each of $A^1$ to $A^{64}$ is independently selected from the group consisting of: a linker, hydrogen (H), an alkyl group having at least one carbon atom, an alkyl group having 1 to 32 carbon atoms, a halogen atom, an alkyl group, an alkenyl group, an oxo group, an alkoxy group, a thiol group, a hydroxyl group, a thioalkyl group, an aryl group, a heteroaryl group, an amine group, a nitro group, a cyano group, an amide group, a sulphonyl group, a carboxy group, and a trifluoromethyl group.

14. The electrowetting element according to claim 1, wherein at least one of the plurality of dye colorant moieties is an azo dye having a formula selected from the group consisting of:

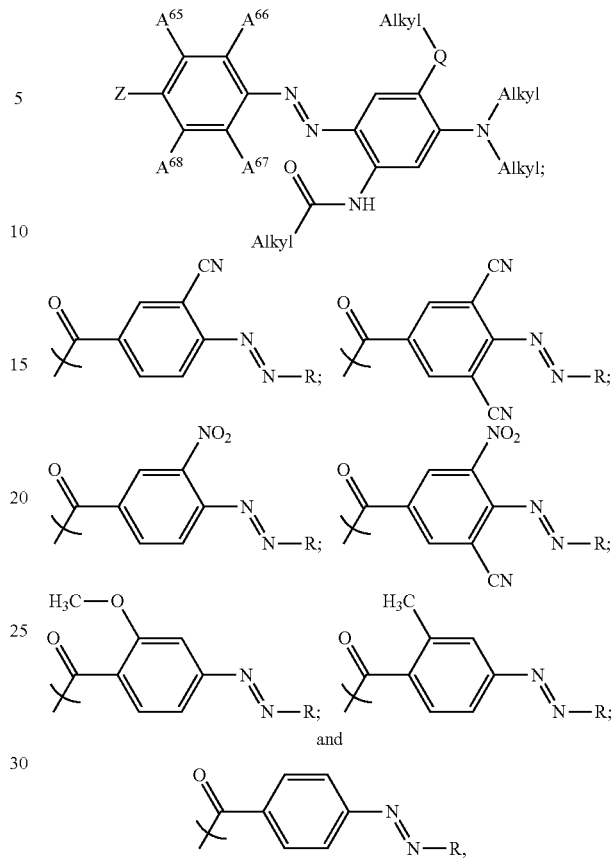

wherein one or more of the following applies:
each Alkyl is independently an alkyl group having at least one carbon atom, or
Alkyl is an alkyl group having 1 to 32 carbon atoms;
Z=one or more of:

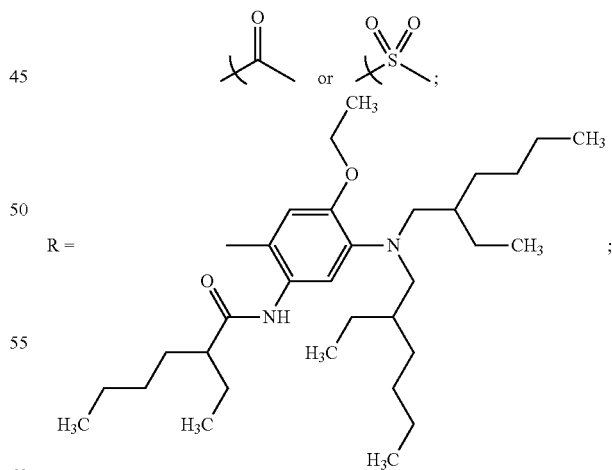

and each of $A^{65}$ to $A^{68}$ is independently selected from the group consisting of: a linker, H, an alkyl group having at least one carbon atom, an alkyl group having 1 to 32 carbon atoms, a halogen atom, an alkyl group, an alkenyl group, an oxo group, an alkoxy group, a thiol group, a hydroxyl group, a thioalkyl group, an aryl group, a heteroaryl group, an amine group, a nitro group, a cyano group, an amide group, a sulphonyl group, a carboxy group, and a trifluoromethyl group.

15. The electrowetting element according to claim 1, comprising a fluid comprising the dye compound.

16. The electrowetting element according to claim 15, comprising a support plate on which the fluid is provided and an electrode arranged relative to the fluid such that applying an electrical potential to the electrode changes a configuration of the fluid.

17. The electrowetting element according to claim 1 comprising:
    a first support plate;
    a second support plate;
    a first fluid comprising the dye compound; and
    a second fluid immiscible with the first fluid, the first fluid and the second fluid located between the first support plate and the second support plate.

18. The electrowetting element according to claim 17, the first support plate comprising an electrode usable to apply a voltage between the electrode and the second fluid to change a configuration of the first fluid and the second fluid.

19. The electrowetting element according to claim 17, wherein the plurality of dye colorant moieties are disposed around the linker in a configuration for reducing backflow of at least one of the first fluid or the second fluid.

20. A display device comprising:
    an electrowetting element comprising:
        a first support plate;
        a second support plate;
        a first fluid comprising a dye compound, the dye compound comprising:
        a plurality of dye colorant moieties comprising:
            a first dye colorant moiety having a first net dipole, and
            a second dye colorant moiety having a second net dipole; and
        a linker, the plurality of dye colorant moieties linked by and disposed around the linker so that the first net dipole and the second net dipole at least partially cancel each other, the linker having at least one of:
    (i) a general formula selected from the group consisting of:

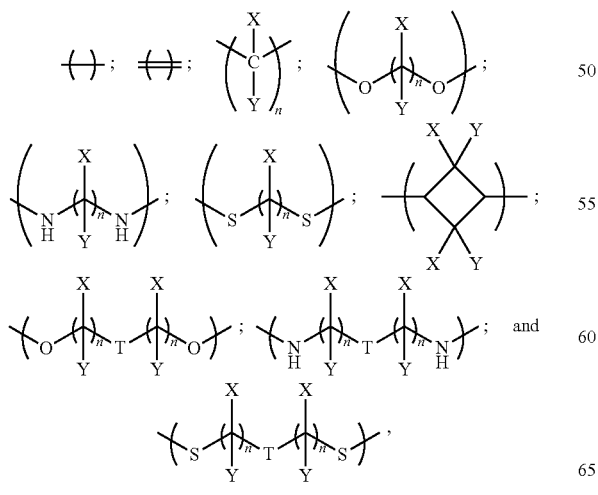

wherein each n independently=one or more of 1, 2, 3, 4, 5, 6, 7 or 8;

one or more of the following applies:
  X and Y are each independently selected from the group consisting of: hydrogen (H), a halogen atom, an alkyl group, an alkenyl group, an aryl group, an alkoxy group, and a thioalkyl group, or
  a pair of X and Y on the same carbon, taken together, is one or more of: an oxo group, an acetal group, or a thioacetal group; and
  T is one or more of: oxygen (O), or sulphur (S);

(ii) a formula selected from the group consisting of:

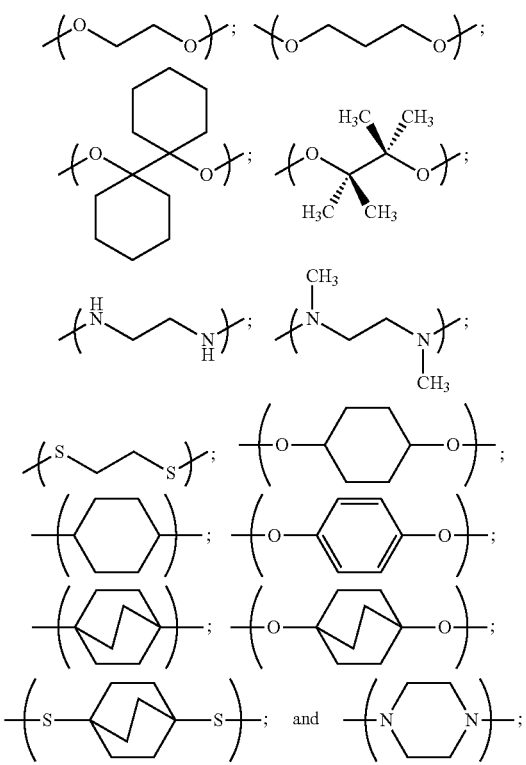

(iii) a formula selected from the group consisting of:

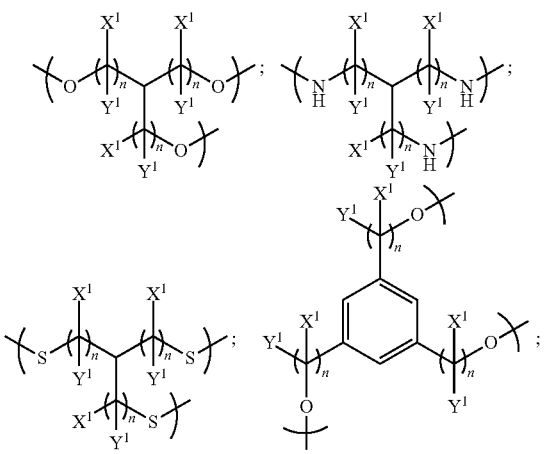

-continued

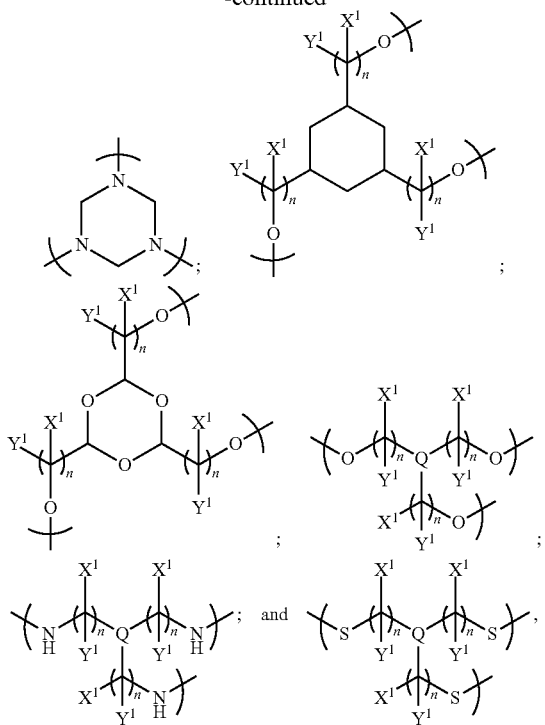

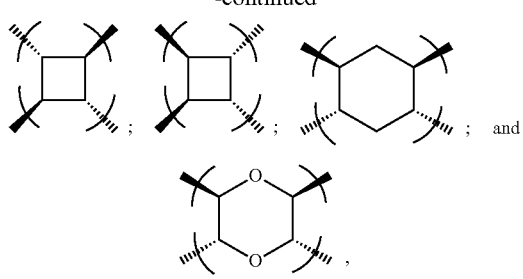

wherein each n independently=one or more of: 1, 2, 3, 4, 5, 6, 7 or 8;

one or more of the following applies:

each of $X^2$ and $Y^2$ is independently selected from the group consisting of: H and an alkyl group, or a pair of $X^2$ and $Y^2$ on the same carbon, taken together, is an oxo group; and alkyl$^1$ is one or more of: an alkyl group having at least one carbon atom, or an alkyl group having 1 to 32 carbon atoms, a second fluid immiscible with the first fluid, the first fluid and the second fluid located between the first support plate and the second support plate; and an electrode usable to apply a voltage between the electrode and the second fluid to change a configuration of the first fluid and the second fluid.

21. The display device of claim 20, wherein at least one of the plurality of dye colorant moieties is of a dye class selected from the group consisting of: an azo dye having the general formula:

wherein each n independently=one or more of: 1, 2, 3, 4, 5, 6, 7, or 8;

Q is one or more of: N or P; and one or more of the following applies:

each of $X^1$ and $Y^1$ is independently selected from the group consisting of: a hydrogen atom (H) and an alkyl group, or a pair of $X^1$ and $Y^1$ on the same carbon, taken together, is an oxo group;

or (iv) a formula selected from the group consisting of:

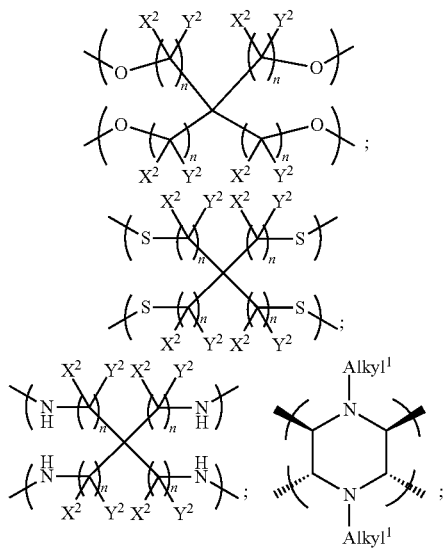

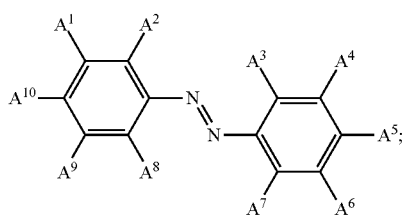

a bisazo dye having the general formula:

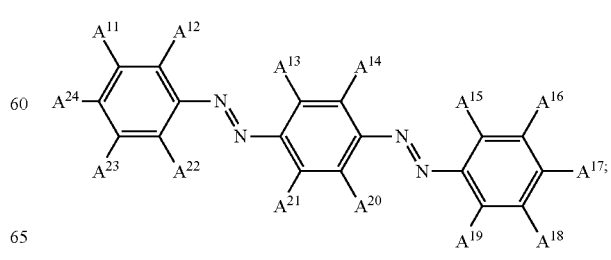

an anthraquinone dye having the general formula:

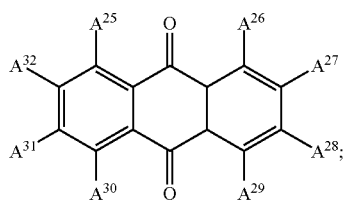

a coumarine dye having the general formula:

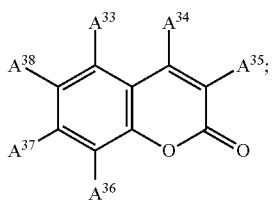

a naphthaquinone dye having the general formula:

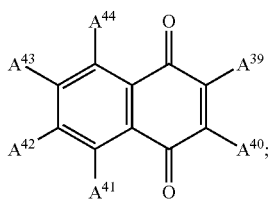

a squaraine dye having the general formula:

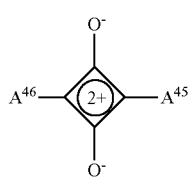

a stilbene dye having the general formula:

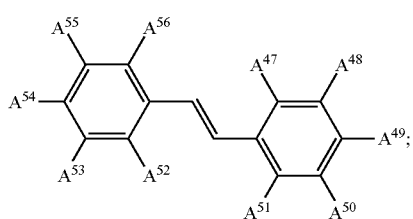

and
an indophenol dye having the general formula:

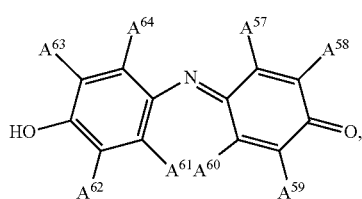

wherein each of $A^1$ to $A^{64}$ is independently selected from the group consisting of: a linker, hydrogen (H), an alkyl group having at least one carbon atom, an alkyl group having 1 to 32 carbon atoms, a halogen atom, an alkyl group, an alkenyl group, an oxo group, an alkoxy group, a thiol group, a hydroxyl group, a thioalkyl group, an aryl group, a heteroaryl group, an amine group, a nitro group, a cyano group, an amide group, a sulphonyl group, a carboxy group, and a trifluoromethyl group.

22. The display device of claim 20, wherein at least one of the plurality of dye colorant moieties is an azo dye having a formula selected from the group consisting of:

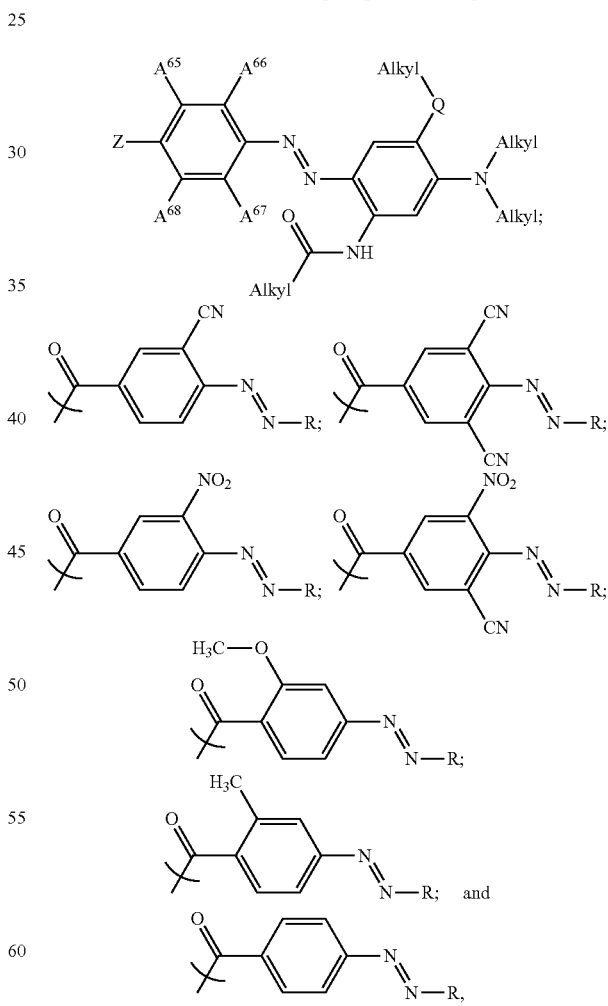

wherein one or more of the following applies:
each Alkyl is independently an alkyl group having at least one carbon atom, or Alkyl is an alkyl group having 1 to 32 carbon atoms;

Z=one or more of:

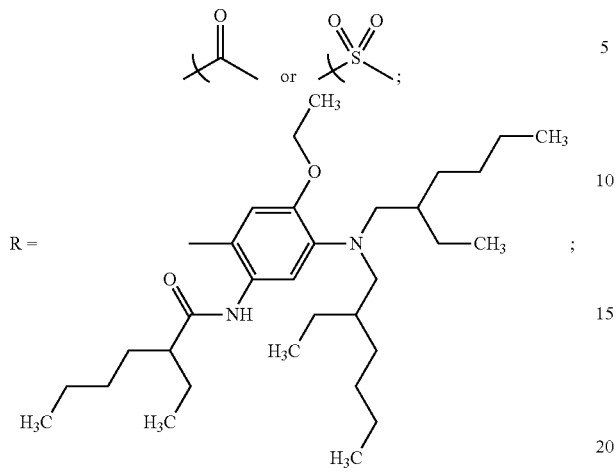

and each of $A^{65}$ to $A^{68}$ is independently selected from the group consisting of: a linker, H, an alkyl group having at least one carbon atom, an alkyl group having 1 to 32 carbon atoms, a halogen atom, an alkyl group, an alkenyl group, an oxo group, an alkoxy group, a thiol group, a hydroxyl group, a thioalkyl group, an aryl group, a heteroaryl group, an amine group, a nitro group, a cyano group, an amide group, a sulphonyl group, a carboxy group, and a trifluoromethyl group.

* * * * *